(12) United States Patent
Fischer et al.

(10) Patent No.: US 8,684,407 B2
(45) Date of Patent: Apr. 1, 2014

(54) AIR BAG WITH HEIGHT ADAPTIVE TETHER

(75) Inventors: Kurt F. Fischer, Leonard, MI (US);
Douglas M. Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 516 days.

(21) Appl. No.: 12/912,800

(22) Filed: Oct. 27, 2010

(65) Prior Publication Data
US 2012/0104734 A1     May 3, 2012

(51) Int. Cl.
B60R 21/2338     (2011.01)

(52) U.S. Cl.
USPC ........................................ 280/743.2; 280/739

(58) Field of Classification Search
USPC ............................................. 280/743.2, 739
See application file for complete search history.

(56) References Cited

U.S. PATENT DOCUMENTS

| | | | |
|---|---|---|---|
| 5,007,662 A * | 4/1991 | Abramczyk et al. .......... | 280/739 |
| 5,246,250 A * | 9/1993 | Wolanin et al. .............. | 280/739 |
| 5,280,953 A * | 1/1994 | Wolanin et al. .............. | 280/739 |
| 5,931,497 A * | 8/1999 | Fischer ....................... | 280/743.1 |
| 6,095,557 A * | 8/2000 | Takimoto et al. ............. | 280/739 |
| 6,254,130 B1 | 7/2001 | Jayaraman et al. ......... | 280/743.2 |
| 6,554,316 B2 | 4/2003 | Schneider et al. | |
| 6,561,545 B2 * | 5/2003 | Greib et al. ................. | 280/743.2 |
| 6,736,426 B2 * | 5/2004 | Winters et al. .............. | 280/743.2 |
| 6,832,778 B2 * | 12/2004 | Pinsenschaum et al. ..... | 280/739 |
| 6,869,103 B2 * | 3/2005 | Ryan et al. .................. | 280/743.2 |
| 6,932,385 B2 * | 8/2005 | Hawthorn et al. ............ | 280/739 |
| 6,981,719 B2 * | 1/2006 | Igawa ......................... | 280/743.2 |
| 7,131,664 B1 | 11/2006 | Pang et al. | |
| 7,134,691 B2 | 11/2006 | Dunkle et al. | |
| 7,152,880 B1 | 12/2006 | Pang et al. | |
| 7,261,319 B2 * | 8/2007 | DePottey et al. ............. | 280/739 |
| 7,347,450 B2 * | 3/2008 | Williams et al. ............. | 280/739 |
| 7,377,548 B2 * | 5/2008 | Bauer et al. ................ | 280/739 |
| 7,396,045 B2 * | 7/2008 | Aranzulla et al. ......... | 280/743.2 |
| 7,445,237 B2 * | 11/2008 | Boyle et al. ................... | 280/739 |
| 7,568,729 B2 * | 8/2009 | Schnieder et al. ............ | 280/739 |
| 7,597,355 B2 * | 10/2009 | Williams et al. ............. | 280/739 |
| 7,597,356 B2 * | 10/2009 | Williams ..................... | 280/739 |
| 7,614,653 B2 * | 11/2009 | Rose et al. .................... | 280/739 |
| 7,625,008 B2 | 12/2009 | Pang et al. | |

(Continued)

FOREIGN PATENT DOCUMENTS

| DE | 603 01 361 | 9/2006 |
|---|---|---|
| DE | 600 35 287 | 2/2008 |

*Primary Examiner* — Nicole Verley

(74) *Attorney, Agent, or Firm* — Tarolli, Sundheim, Covell & Tummino LLP

(57) ABSTRACT

An apparatus (10) for helping to protect an occupant (20) of a vehicle (12) includes an inflatable vehicle occupant protection device (14) having a deflated condition and an inflated condition. The protection device (14) includes a panel (74) having a portion presented toward the occupant (20) when the protection device is in the inflated condition. A tether (60) has a first connection (78) to a first portion (80) of the panel (74) and a second connection (72) to a second portion (76) of the panel. The tether (60) is operative to limit deployment of the second portion (76) of the panel (74) in response to unrestricted deployment of the first portion (80) of the panel. The tether (60) is also operative to permit further deployment of the second portion (76) of the panel (74) in response to occupant penetration into the first portion (80) of the panel.

30 Claims, 22 Drawing Sheets

(56) References Cited

U.S. PATENT DOCUMENTS

| | | | |
|---|---|---|---|
| 7,651,130 B2 * | 1/2010 | Bauberger | 280/743.2 |
| 7,722,079 B2 * | 5/2010 | Lee et al. | 280/739 |
| 7,722,080 B2 * | 5/2010 | Rose et al. | 280/743.2 |
| 7,726,685 B2 * | 6/2010 | Abe et al. | 280/736 |
| 7,748,738 B2 * | 7/2010 | Schneider | 280/740 |
| 7,784,828 B2 * | 8/2010 | Matsu et al. | 280/739 |
| 7,789,421 B2 * | 9/2010 | Issler et al. | 280/743.2 |
| 7,837,228 B2 * | 11/2010 | Abe | 280/743.1 |
| 7,845,681 B2 * | 12/2010 | Abe et al. | 280/743.1 |
| 7,857,346 B2 * | 12/2010 | Reiter et al. | 280/743.2 |
| 7,878,538 B2 * | 2/2011 | Abe et al. | 280/739 |
| 7,883,110 B2 * | 2/2011 | Pausch | 280/739 |
| 7,922,197 B2 * | 4/2011 | Fukawatase et al. | 280/739 |
| 7,922,200 B2 * | 4/2011 | Webber | 280/743.2 |
| 7,931,297 B2 * | 4/2011 | Abe et al. | 280/739 |
| 7,942,443 B2 * | 5/2011 | Dennis et al. | 280/743.2 |
| 7,954,850 B2 * | 6/2011 | Fischer et al. | 280/743.1 |
| 7,959,184 B2 * | 6/2011 | Fukawatase et al. | 280/739 |
| 8,020,889 B2 * | 9/2011 | Bauer et al. | 280/739 |
| 8,020,891 B2 * | 9/2011 | Fukawatase et al. | 280/739 |
| 8,070,183 B2 * | 12/2011 | Kumagai et al. | 280/743.2 |
| 8,226,118 B2 * | 7/2012 | Rose et al. | 280/743.2 |
| 8,262,130 B2 * | 9/2012 | Fischer et al. | 280/743.2 |
| 8,322,748 B2 * | 12/2012 | Abe et al. | 280/739 |
| 2002/0175511 A1 | 11/2002 | Dunkle et al. | |
| 2003/0168842 A1 | 9/2003 | Igawa | |
| 2005/0001412 A1 * | 1/2005 | Schneider et al. | 280/730.1 |
| 2005/0052008 A1 * | 3/2005 | Rose et al. | 280/740 |
| 2005/0225065 A1 * | 10/2005 | Fujll | 280/743.2 |
| 2007/0045997 A1 * | 3/2007 | Abe et al. | 280/729 |
| 2007/0108750 A1 * | 5/2007 | Bauer et al. | 280/740 |
| 2007/0108753 A1 | 5/2007 | Pang et al. | |
| 2007/0145729 A1 * | 6/2007 | Ishiguro et al. | 280/739 |
| 2007/0205591 A1 * | 9/2007 | Bito | 280/743.2 |
| 2008/0073890 A1 * | 3/2008 | Williams et al. | 280/739 |
| 2008/0315567 A1 * | 12/2008 | Fischer et al. | 280/732 |
| 2009/0115176 A1 | 5/2009 | Reiter et al. | |
| 2010/0052297 A1 | 3/2010 | Fukawatase et al. | |
| 2010/0102542 A1 * | 4/2010 | Nakajima et al. | 280/743.2 |
| 2010/0140910 A1 | 6/2010 | Fischer et al. | |
| 2010/0201107 A1 * | 8/2010 | Abe et al. | 280/730.1 |
| 2011/0198828 A1 * | 8/2011 | Fischer et al. | 280/743.2 |
| 2011/0260431 A1 * | 10/2011 | Kwon | 280/730.1 |

* cited by examiner

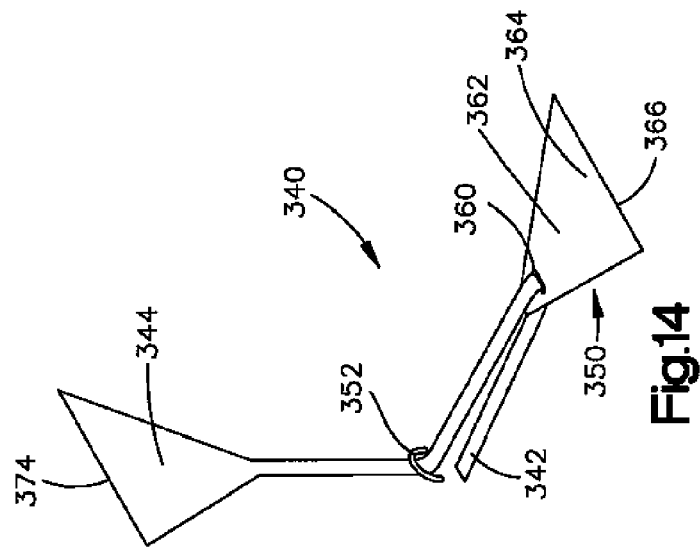
Fig.14
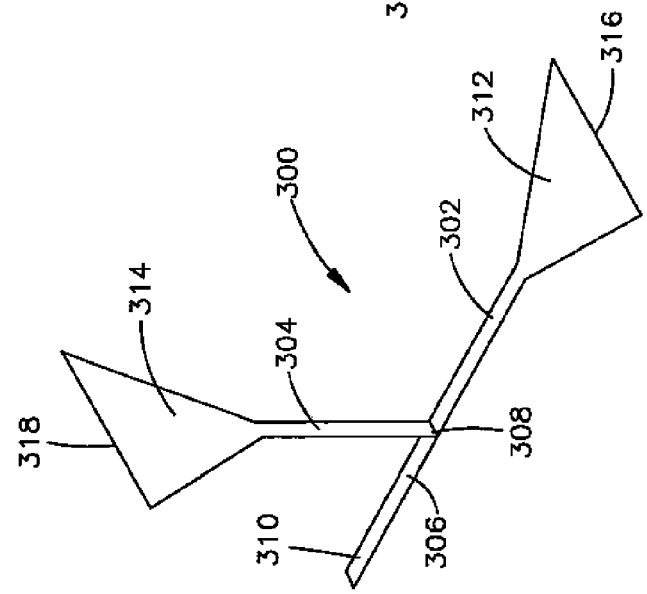
Fig.13
Fig.12

AIR BAG WITH HEIGHT ADAPTIVE TETHER

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

SUMMARY OF THE INVENTION

The present invention relates to an apparatus for helping to protect an occupant of a vehicle. The apparatus includes an inflatable vehicle occupant protection device having a deflated condition and an inflated condition. The protection device includes a panel having a portion presented toward the occupant when the protection device is in the inflated condition. A tether has a first connection to a first portion of the panel and a second connection to a second portion of the panel. The tether is operative to limit deployment of the second portion of the panel in response to unrestricted deployment of the first portion of the panel. The tether is also operative to permit further deployment of the second portion of the panel in response to occupant penetration into the first portion of the panel.

The present invention also relates to an apparatus for helping to protect an occupant of a vehicle. The apparatus comprises an inflatable vehicle occupant protection device having a deflated condition and an inflated condition. A tether has a first end connected to a first portion of the protection device and an opposite second end connected to a second portion of the protection device. The tether extends through and is redirected by at least one guide on the protection device. The tether becomes tensioned between the first and second portions of the protection device when the protection device is in the inflated condition. The first portion of the protection device applies a force to the tether that is greater than a force applied to the tether by the second portion of the protection device when the protection device is the inflated condition. The tether restricts deployment of the second portion of the protection device.

The present invention further relates to an apparatus for helping to protect an occupant of a vehicle. The apparatus comprises an inflatable vehicle occupant protection device having a deflated condition and an inflated condition. The apparatus also comprises a guide on the protection device and a tether that extends through the guide. The tether shapes the protection device in the inflated condition. The tether comprises a first segment that extends from the guide to a first connection with a first portion of the protection device. The tether also comprises a second segment that extends from the guide to a second connection with a second portion of the protection device. The first segment of the tether permits full deployment of the first portion of the protection device and the second segment restricts deployment of the second portion of the protection device in response to uninhibited deployment of the protection device. The tether is also constructed and arranged so that occupant penetration into the first portion of the protection device causes the tether to move through the guide to shorten the first segment and lengthen the second segment to permit further deployment of the second portion of the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 12-14 are perspective views illustrating different constructions of certain portions of the apparatus of FIGS. 1-10;

DETAILED DESCRIPTION OF THE INVENTION

Figure 1:
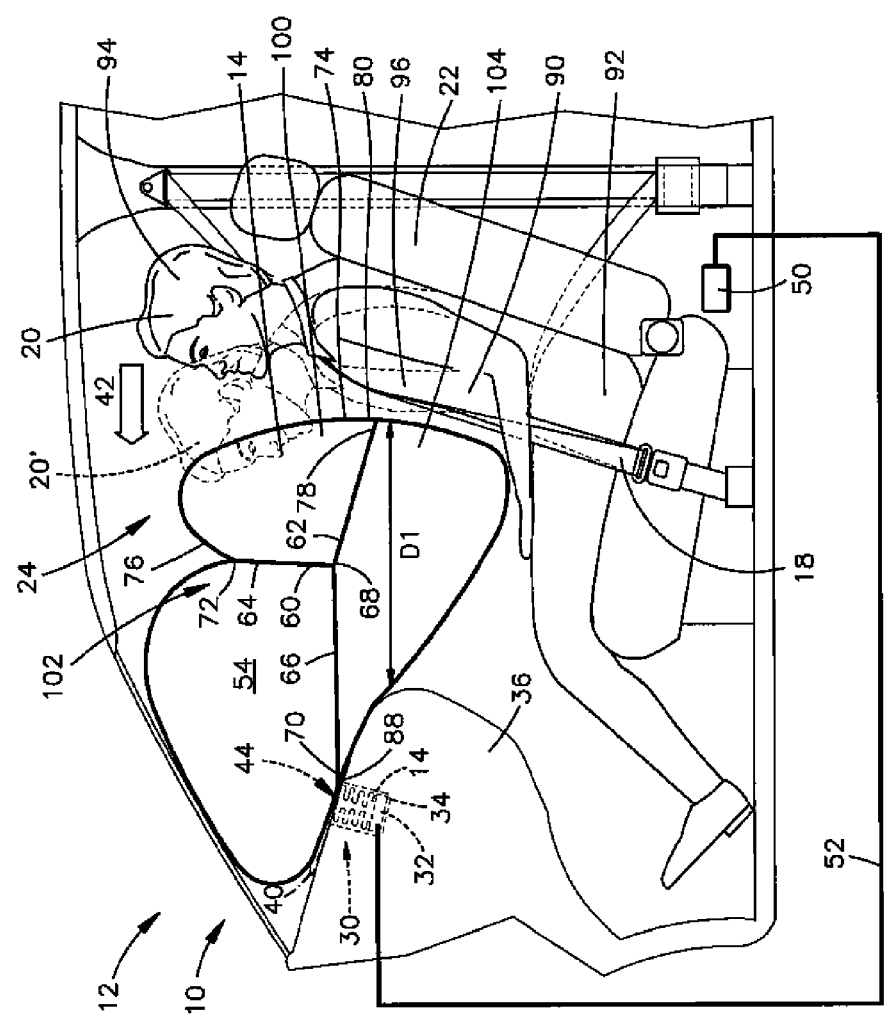
FIGS. 1 and 2 are schematic side views illustrating different conditions of an apparatus for helping to protect an occupant of a vehicle, according to a first embodiment of the invention.
Figure 2:
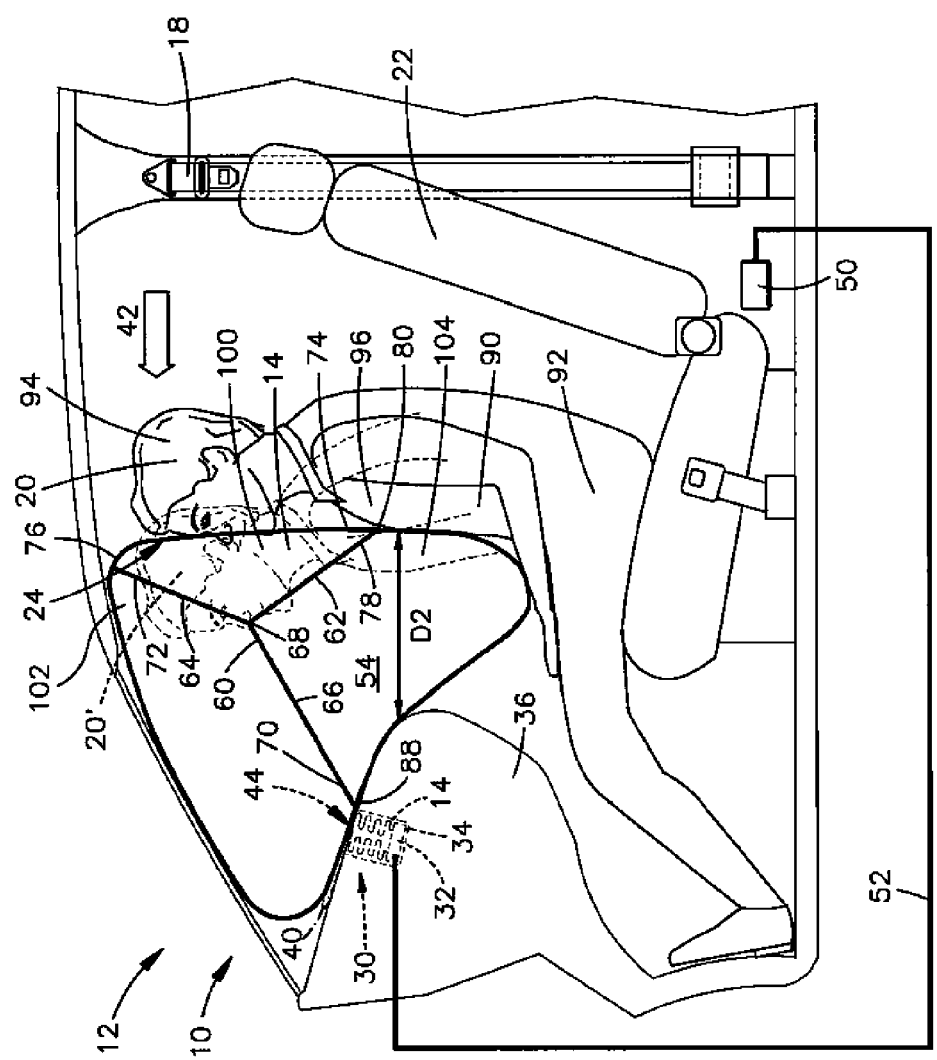

An apparatus 10 for helping to protect an occupant 20 of a vehicle 12 includes an inflatable vehicle occupant protection device 14 in the form of an air bag. In the embodiment illustrated in FIGS. 1 and 2, the air bag 14 is a passenger frontal air bag for helping to protect an occupant 20 of a seat 22 on a passenger side 24 of the vehicle 12. As shown in FIGS. 1 and 2, the vehicle 12 also includes a seatbelt 18 for helping to protect the vehicle occupant 20.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, while inflated, helps protect the vehicle occupant 20 from impacts with parts of the vehicle 12, such as the instrument panel 36.

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant is moved forward, as indicated by the arrow labeled 42 in FIGS. 1 and 2, into engagement with the air bag 14. The "penetration" of the occupant into the air bag 14 is the distance or degree to which the occupant 20 moves into the inflated depth of the air bag. In other words, the degree of penetration could be measured as the distance a given point on the front panel 74 is moved toward the instrument panel 36 by the penetrating occupant 20. For example, the degree of penetration in FIG. 2 can be calculated as the difference between the inflated depth labeled D1 in FIG. 1 and the penetrated depth labeled D2 in FIG. 2. Alternatively, penetration could be measured as the distance between a point on the front panel 74 and a fixed point on the instrument panel 36 or between a point on the occupant 20 (e.g., the occupant's chest) and a fixed point on the instrument panel.

Several factors determine the degree to which an occupant 14 penetrates the air bag 14. For example, the size or mass of the occupant 20, the speed at which the occupant strikes the air bag 14, the pressurization of the air bag, and whether or not the occupant is restrained by the seatbelt 18 all help determine the degree to which the occupant penetrates the air bag in a given deployment scenario. Some of these determining factors are illustrated in FIG. 11, which depicts chest to instrument panel air bag penetration for occupants that are different in size, that are belted versus unbelted, and that strike the air bag 14 at different speeds.

Figure 11:
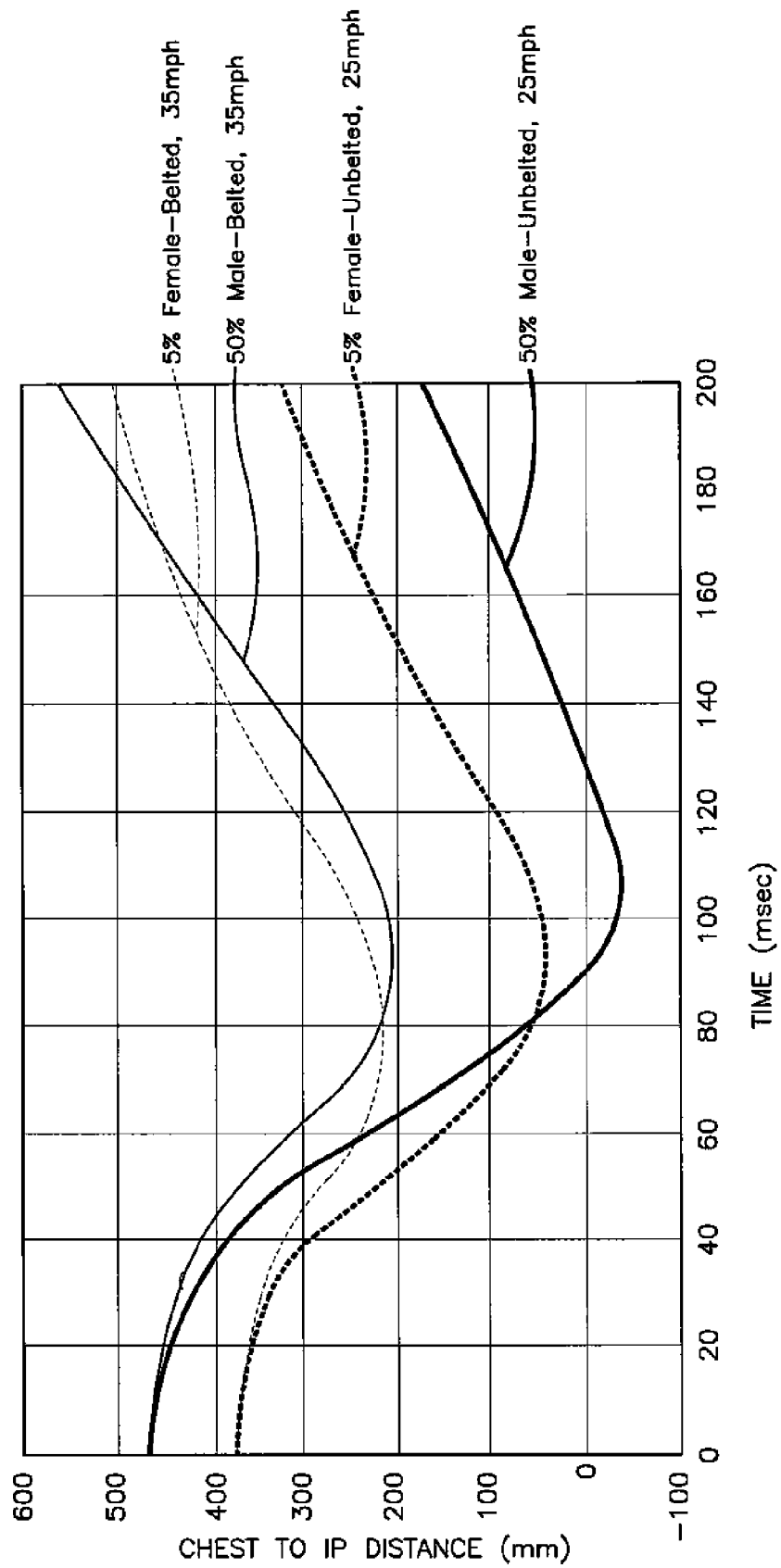
FIG. 11 is a chart illustrating certain occupant characteristics under different vehicle operating conditions.

FIG. 11 illustrates penetration values for two differently sized occupants—a $50^{th}$ percentile male occupant (50% male) and a $5^{th}$ percentile female occupant (5% female). The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 95% female. The 5% female is thus a small female occupant.

FIG. 11 illustrates that whether the occupant is belted versus unbelted has an effect on occupant penetration into the air bag. As shown in FIG. 11, an unbelted 5% female occupant travelling at 25 mph penetrates the air bag approximately 200 mm more than a belted 5% female occupant traveling at 35 mph. Similarly, an unbelted 50% male occupant travelling at 25 mph penetrates the air bag well over 200 mm more (approximately 225 mm) than a belted 50% male occupant traveling at 35 mph. In fact, the unbelted 50% female traveling at 25 mph penetrates the air bag approximately 150 mm more than the belted 50% male occupant traveling at 35 mph.

The air bag 14 may have one or more actuatable features for helping to control or tailor inflation, deployment, and pressurization of the air bag in response to vehicle conditions, occupant conditions, or both vehicle and occupant conditions. According to the present invention, these features are actuatable passively in response to vehicle and occupant conditions at the time of inflation. Thus, in the illustrated embodiment, these features are actuatable without relying on active sensors and/or actuators, such as electrical or pyrotechnic actuators. Those skilled in the art will appreciate that certain ones of these features could be actuated actively, for example in response to conditions determined via active sensors.

Referring to FIGS. 1 and 2, the air bag 14 includes a tether 60 for adapting the configuration of the air bag 14 depending on one or more vehicle or occupant conditions in the vehicle 12. In the embodiment of FIGS. 1 and 2, the adaptive tether 60 is a three-leg tether that includes a first segment that serves as a trigger tether 62, a second segment that serves as a shaping tether 64, and a third segment that serves as an anchor tether 66. The trigger tether 62, shaping tether 64, and anchor tether 66 intersect and are interconnected at a common point 68 from which the tethers extend.

The anchor tether 66 has a first end portion 70 secured to the air bag 14 (e.g., to a rear panel of the air bag) or to structure of the vehicle 12, such as the air bag module 30 (e.g., the canister 34) or the instrument panel 36, at an anchor point 88. The shaping tether 64 has a first end portion 72 secured to the air bag 14, for example to the front panel 74 of the air bag 14. In the embodiment illustrated in FIGS. 1 and 2, the first end portion 72 of the shaping tether 64 is connected to an upper portion 76 of the front panel 74 of the air bag 14. The trigger tether 62 has a first end portion 78 secured to the air bag 14, for example to the front panel 74 of the air bag 14. In the embodiment illustrated in FIGS. 1 and 2, the first end portion 78 of the trigger tether 66 is connected to a mid or lower portion 80 of the front panel 74 of the air bag 14.

The mid/lower portion 80 of the front panel 74 to which the trigger tether 62 is connected has a large surface area and radius of curvature (see FIG. 1) compared to the surface area and radius of curvature of the upper portion 76 of the front panel to which the shaping tether 64 is connected (see FIG. 2). The degree to which the surface area and radius of curvature of the upper portion 76 is smaller than that of the mid/lower portion 80 may be several fold. For the construction illustrated in FIGS. 1 and 2, the mid/lower portion 80 of the front panel 74 exerts a force on the trigger tether 62 that is greater than the force exerted on the shaping tether 64 by the upper portion 76 of the front panel.

When the air bag 14 inflates and deploys, the gas pressure in the bag acts normal to the surface of the panels defining the inflatable volume 54 of the bag. The gas pressure in the air bag 14, acting on the comparatively large surface area of the mid/lower portion 80, exerts a correspondingly large force on the trigger tether 62. Conversely, the gas pressure acting on the comparatively small surface area of the upper portion 76 exerts a correspondingly small force on the shaping tether 64.

Due to this and the three-leg configuration of the tether 60, as shown in FIG. 1, the tether becomes tensioned between the front panel 74 and the anchor point 88 in a substantially straight line along the anchor tether 66 and the trigger tether 62. As a result, the force urged on the shaping tether 64 by the upper portion 76 is substantially overcome by the tensioning of the anchor tether 66 and trigger tether 62, which causes the shaping tether to restrict deployment of the upper portion 76, thus giving the air bag 14 the shape illustrated in FIG. 1.

According to the present invention, the adaptive tether 60 is responsive to vehicle conditions, occupant conditions, or both vehicle conditions and occupant conditions to adapt the inflated condition of the air bag 14. Particularly, the tether 60 may adapt the inflation, deployment, configuration, shape, pressurization, or a combination thereof, of the air bag 14. According to the embodiment of FIGS. 1-2, this control is implemented passively through the physical construction and configuration of the air bag 14 and the adaptive tether 60.

In particular, in the embodiment of FIGS. 1 and 2, the air bag 14 and adaptive tether 60 are constructed, configured, and arranged to adapt the inflated condition of the air bag 14 depending on whether the occupant 20 is restrained by the seatbelt 18 at the time that the air bag 14 is deployed. This is beneficial because, as described above and with reference to the data shown in FIG. 11, an unbelted occupant penetrates into the air bag 14 to a greater extent and at a different location on the bag than a belted occupant.

As shown in FIG. 1, in the case of a belted occupant 20, the seatbelt 18 serves to help restrain the occupant 20. As a result, the belted occupant 20, especially the occupant's lower torso 90 and hips 92 are restrained from moving toward the instrument panel 36. This allows the air bag 14 to inflate and deploy with comparatively little resistance or inhibition from the occupant 20. As shown in dashed lines at 20', the belted occupant's head 94 and upper torso 96 penetrate into a middle portion 100 of the air bag 14. The middle portion 100 is positioned below an upper portion 102 of the air bag in the area where the end portion 72 of the shaping tether 64 is connected to the front panel 74. The middle portion 100 is also positioned above a lower portion 104 of the air bag 14, in the area where the end portion 78 of the trigger tether 62 is connected to the front panel 74. As shown in FIG. 1, the degree or distance to which the occupant 20' penetrates into the air bag 14 may be comparatively or relatively small.

As shown in FIG. 2, in the case of an unbelted occupant 20, the seatbelt 18 does not help restrain the occupant 20. As a result, the unbelted occupant 20, including the occupant's lower torso 90 and hips 92, are not restrained from moving toward the instrument panel 36. Thus, as the air bag 14 inflates and deploys in response to the vehicle impact, the occupant's entire body moves unrestrained toward the instrument panel 36. As shown in dashed lines at 20', when this occurs, the unbelted occupant 20 may also move upward as the occupant moves toward the instrument panel 36. This can occur for several reasons. The seat bottom may be inclined upward from rear to front, so the occupant 20, moving forward on the seat bottom, also moves upward. Also, the occupant 20, in moving forward, may also move from a reclined position to an upright position. Further, the occupant 20 may move upward off the seat (not shown) as he or she moves forward in the vehicle.

As shown in dashed lined in FIG. 2, the occupant's head 94 penetrates into the upper portion 102 of the air bag 14. The occupant's upper torso 96 penetrates into the middle portion 100 of the air bag 14. The occupant's lower torso 90 penetrates into the lower portion 104 of the air bag 14. As shown in FIG. 2, the degree or distance to which the occupant 20' penetrates into the air bag 14 may be comparatively or relatively large or substantial when viewed in comparison with the belted occupant (see FIG. 1).

From the above, those skilled in the art will appreciate that the tether 60 of the embodiment of FIGS. 1 and 2 tailors the inflated condition of the air bag 14 in response to the buckled status of the vehicle occupant 20. In the case of the buckled occupant 20, the tether 60 helps maintain the configuration illustrated in FIG. 1, restraining the upper portion 102 from deploying fully while permitting the lower portion 104 to deploy fully. As a result, the air bag 14 is initially deployed and maintained in configuration of FIG. 1, which is a low volume configuration in comparison with the configuration of FIG. 2. The low volume configuration of the air bag 14 in FIG. 1 requires a lesser volume of inflation fluid in order to achieve the desired inflation, deployment, and pressurization characteristics. This can help reduce the required size and cost of the inflator and also helps ensure reliability in inflation and deployment. Since the unbuckled occupant is the worst case scenario, the inflator 32 is sized to provide a volume of inflation fluid sufficient to inflate, deploy, and pressurize the air bag 14 to the large volume inflated condition of FIG. 2 within the desired performance parameters. This being the case, the volume of inflation fluid delivered by the inflator 32 is certainly sufficient to inflate, deploy, and pressurize the air bag 14 to the small volume inflated condition of FIG. 1 within the desired performance parameters. Since the buckled occupant is the expected condition, the tether configuration of FIGS. 1 and 2 helps bolster the reliability of the apparatus.

In the case of the unbuckled occupant 20, the air bag 14 initially inflates toward the configuration where the tether 60 maintains the basic configuration illustrated in FIG. 1. The unbelted occupant 20, however, being unrestrained by the seatbelt 18, moves into engagement with the lower portion 104, moves the lower portion toward the instrument panel 36, thus relieving the force exerted on the trigger tether 62 by the mid/lower portion 80 of the front panel 74. As a result, this relieves the tension in the trigger tether 62 and anchor tether 64 between the front panel 74 and the anchor point 88. This causes the trigger tether 62 and anchor tether 66 to deflect, which allows the force exerted on the shaping tether 64 by the upper portion 76 of the front panel 74 to move the tether 60 to the condition illustrated in FIG. 2. When this occurs, the tether 60 releases the upper portion 102 of the air bag 14 to deploy fully to the position illustrated in FIG. 2. The upper portion 102, when in this position, is positioned to receive and cushion the unbelted occupant 20'. Those skilled in the art will appreciate that the degree to which the tether 60 releases the upper portion 102 of the air bag to deploy is proportional to the degree to which the occupant 20 penetrates the air bag 14.

Those skilled in the art will thus appreciate that, advantageously, the tether 60 of the present invention adapts the configuration of the air bag 14 depending on whether the occupant 20 is restrained by the seatbelt 18. The tether 60 tailors the configuration of the air bag 14 so that the air bag has a comparatively small volume while covering the space where the buckled occupant 20 (FIG. 1) strikes the air bag. Also, the tether 60 tailors the configuration of the air bag 14 so that the air bag has a comparatively large volume while covering the space where the unbuckled occupant 20 (FIG. 2) strikes the air bag.

Figure 3:
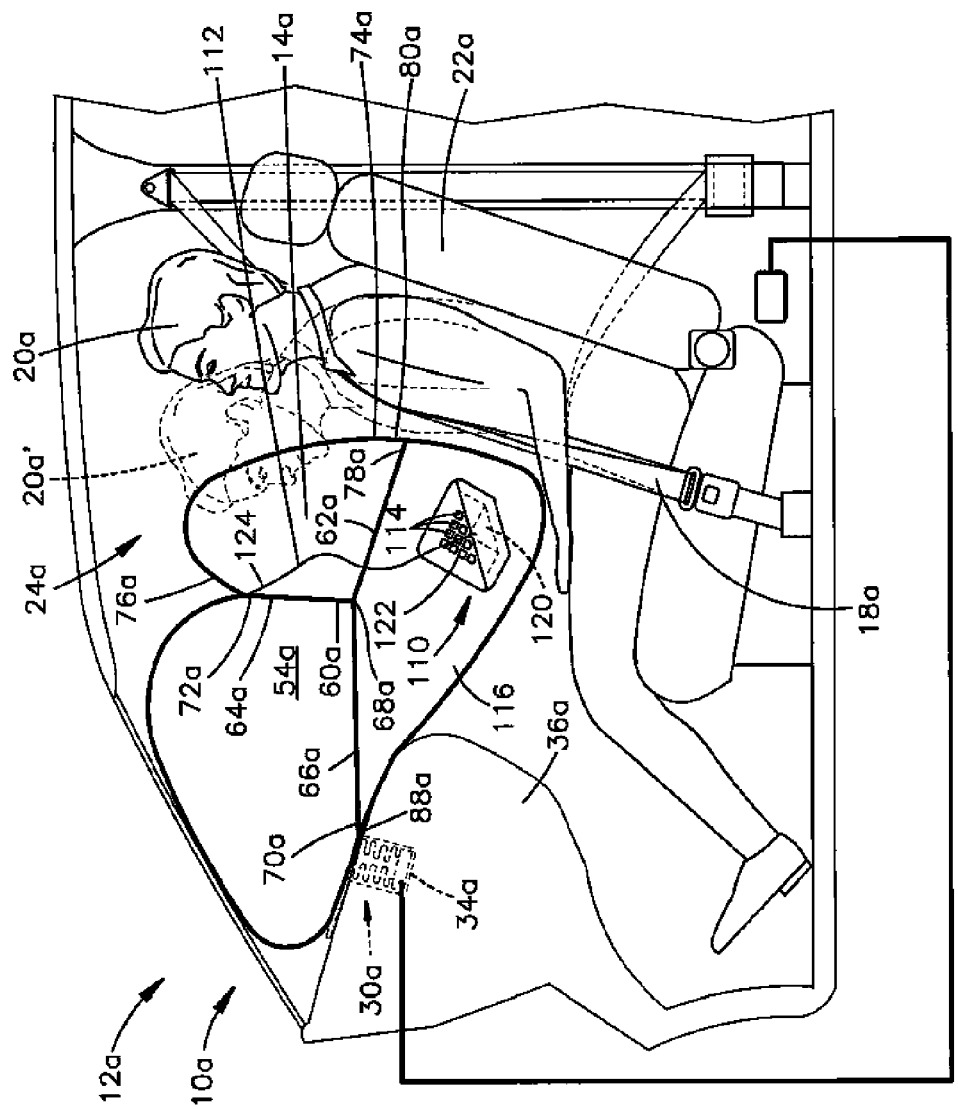
FIGS. 3 and 4 are schematic side views illustrating different conditions of an apparatus for helping to protect an occupant of a vehicle, according to a second embodiment of the invention.
Figure 4:
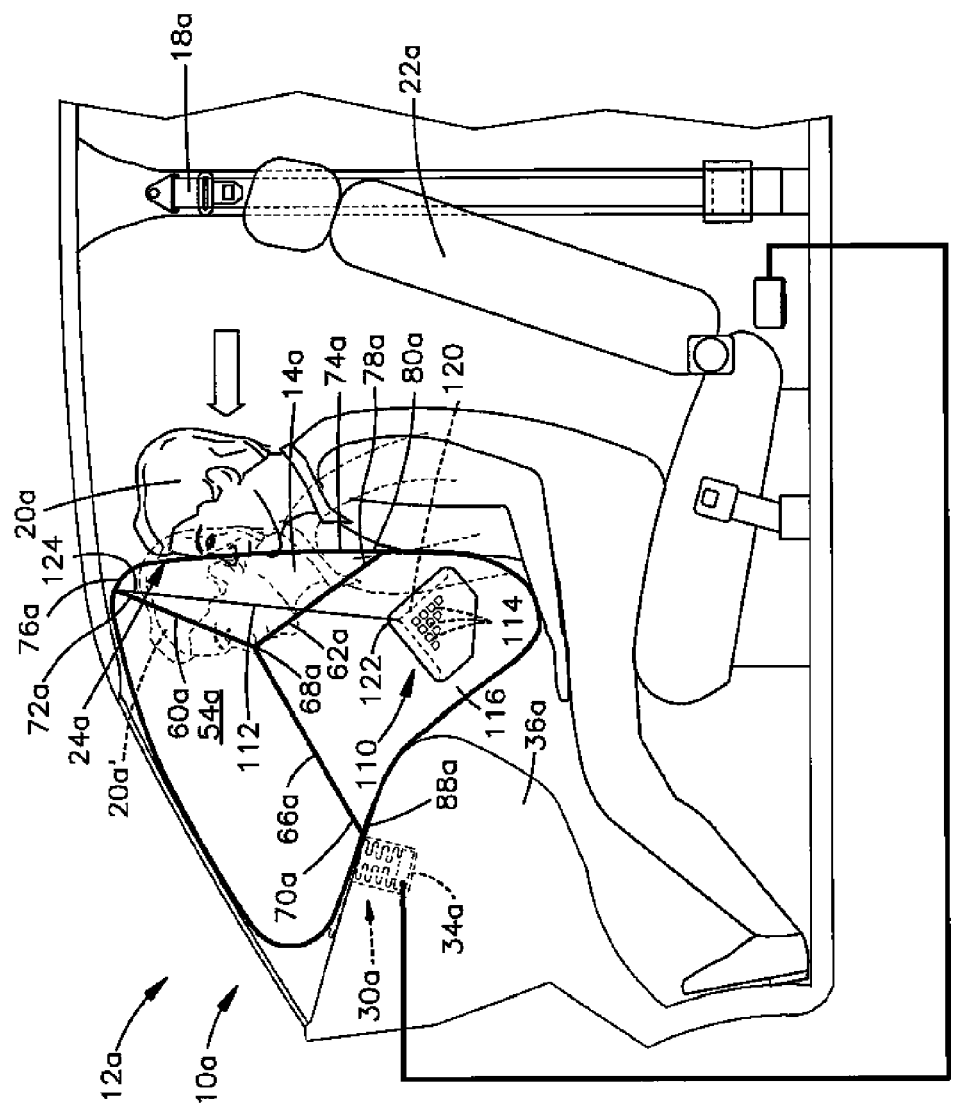

A second embodiment of the present invention is illustrated in FIGS. 3 and 4. Certain components in FIGS. 3 and 4 are similar or identical to components of FIGS. 1 and 2. The suffix "a" is added to the reference numbers of these similar or identical components in FIGS. 3 and 4 to avoid confusion.

Referring to FIGS. 3 and 4, an apparatus 10a for helping to protect an occupant 20a of a vehicle 12a includes an inflatable vehicle occupant protection device 14a in the form of an air bag. In the embodiment illustrated in FIGS. 3 and 4, the air bag 14a is a passenger frontal air bag for helping to protect an occupant 20a of a seat 22a on a passenger side 24a of the vehicle 12a. As shown in FIGS. 3 and 4, the vehicle 12a also includes a seatbelt 18a for helping to protect the vehicle occupant 20a.

The air bag 14a of the second embodiment may be similar or identical in construction and function to the air bag of the embodiment of the present invention illustrated in FIGS. 1 and 2. The air bag 14a of the second embodiment thus may be part of an air bag module 30a that is similar or identical in configuration and function to the module of the embodiment of FIGS. 1 and 2. The air bag 14a also includes a tether 60a for adapting the configuration of the air bag 14a depending on vehicle or occupant conditions. In the embodiment of FIGS. 3 and 4, the adaptive tether 60a is a three-leg tether that is similar or identical in construction, configuration, and function to the tether disclosed in FIGS. 1 and 2. The tether 60a thus includes a first segment that serves as a trigger tether 62a, a second segment that serves as a shaping tether 64a, and a third segment that serves as an anchor tether 66a interconnected at a common point 68a from which the tethers extend.

The anchor tether 66a has a first end portion 70a secured to the air bag 14a (e.g., to a rear panel of the air bag) or to structure of the vehicle 12a, such as the air bag module 30a (e.g., the canister 34a) or the instrument panel 36a, at an anchor point 88a. The shaping tether 64a has a first end portion 72a secured to the air bag 14a, for example to the front panel 74a of the air bag 14a. In the embodiment illustrated in FIGS. 3 and 4, the first end portion 72a of the shaping tether 64a is connected to an upper portion 76a of the front panel 74a of the air bag 14a. The trigger tether 62a has a first end portion 78a secured to the air bag 14a, for example to the front panel 74a of the air bag 14a. In the embodiment illustrated in FIGS. 3 and 4, the first end portion 78a of the trigger tether 66a is connected to a mid or lower portion 80a of the front panel 74a of the air bag 14a.

The adaptive tether 60a of the embodiment of FIGS. 3 and 4 is responsive to vehicle conditions, occupant conditions, or both vehicle conditions and occupant conditions to adapt the inflated condition of the air bag 14a. Particularly, the tether 60a may adapt the inflation, deployment, configuration, shape, pressurization, or a combination thereof, of the air bag 14a passively, in a manner that is similar or identical to the embodiment of FIGS. 1 and 2. In particular, in the embodiment of FIGS. 3 and 4, the air bag 14a and adaptive tether 60a are constructed, configured, and arranged to adapt the inflated condition of the air bag 14a depending on whether the occupant 20a is restrained by the seatbelt 18a at the time that the air bag 14a is deployed.

The air bag 14a of the embodiment of FIGS. 3 and 4 also includes a vent 110 that is selectively actuatable to release inflation fluid from the inflatable volume 54a of the air bag 14a. The vent 110 includes an adaptive vent tether 112 that is operative to actuate the vent 110 in response to at least one vehicle or occupant condition at the time the air bag is deployed. The vent 110 thus may selectively release inflation fluid from the air bag 14a depending on these conditions.

The vent 110 may have various configurations. In the embodiment illustrated in FIGS. 3 and 4, the vent 110 includes one or more vent openings 114 formed in a panel 116, such as a side panel, of the air bag 14a. A vent door 120 is secured to the side panel 116. The vent tether 112 has a first end portion 122 secured to the vent door 120 and a second end portion 124 secured to the air bag 14a. In the embodiment of FIGS. 3 and 4, the second end portion 124 is secured to the upper portion 76a of the front panel 74a of the air bag 14a. More specifically, the second end portion 124 of the vent tether 112 may be connected to the upper portion 76a of the front panel 74a at or near the location where the end portion of the shaping tether 64a is connected to the upper portion.

The vent door 120 is secured to the panel 116 by known means (not shown), such as stitching, ultrasonic welding, heat bonding, or adhesives. The vent 110 has an open condition (FIG. 3) in which the vent door 120 is positioned away from the vent openings 114 and thereby permits inflation fluid to vent, i.e., flow, through the vent openings. In the open condition, the vent door 120 is folded away from the vent openings 114 and held in place by releasable means (not shown), such as tear stitching. When tension on the vent tether 112 reaches a threshold magnitude, the tear stitching 120 ruptures, which releases the vent door 120 to move to the closed condition illustrated in FIG. 4. In the closed condition, the vent door 120 covers the vent openings 114 and thereby prevents inflation fluid from venting from the inflatable volume 54a.

The vent 110 is constructed and arranged to adapt to vehicle conditions, occupant conditions, or both in the vehicle 12a at the time the air bag is deployed. More particularly, the vent 110 is constructed and arranged to adapt to whether the occupant 20a is belted or un-belted at the time of an event for which inflation of the air bag 14a is desired. This is because the vent tether 112, being connected to the upper portion 76a of the front panel 74a at or near the connection of the shaping tether 64a, is configured to become tensioned in response to deployment of the upper portion.

According to the embodiment of FIGS. 3 and 4, the vent 110 remains open and vents inflation fluid from the inflatable volume 54a in response to a belted occupant 20a (FIG. 3). Maintaining the vent 110 in the open condition in the case of the belted occupant 20a may be desirable. For example, since the belted occupant 20a is restrained by the seatbelt 18a, it may be desirable to provide a lower degree of air bag pressurization to produce the necessary degree of energy dissipation and absorption.

Additionally, according to the embodiment of FIGS. 3 and 4, the vent 110 closes and blocks inflation fluid from venting from the inflatable volume 54a in response to an un-belted occupant 20a (FIG. 4). Maintaining the vent 110 in the closed condition in the case of the un-belted occupant 20a may also be desirable. For example, since the un-belted occupant 20a is not restrained by the seatbelt 18a, it may be desirable to provide a higher degree of air bag pressurization to produce the necessary degree of energy dissipation and absorption.

From the above, those skilled in the art will appreciate that, according to the present invention, the adaptive tether 60a and the vent 110 in combination act to shape the air bag 14a and vent inflation fluid from the air bag in the event of a belted occupant 20a, and act to shape the air bag and block inflation fluid venting in the event of an un-belted occupant. Advantageously, the adaptive shaping and venting achieved through the adaptive tether 60a and vent 110 are controlled passively and respond without the need to actively monitor the occupant or vehicle and without the need to actively actuate the tether or vent. The adaptive tether 60a and vent 110 respond to air bag deployment and the manner in which the occupant 20a strikes the bag.

As another advantage, by adjusting the relative lengths of the adaptive tether 60a and the vent tether 112 or by adjusting the relative positions at which the adaptive tether and vent tether are connected to the air bag 14a, the air bag can be adapted to vent inflation fluid from the air bag when the bag is at a predetermined shape defined by the shaping tether 64a. For example, the relative lengths of the tethers 60a and 112, the relative positions at which the tethers are connected to the air bag 14a, or both the relative lengths and connection positions of the tethers could be adapted such that the vent 110 blocks inflation fluid venting at any time before or up to the time that the air bag reaches the fully inflated and deployed condition of FIG. 4. Therefore, although the vent 110 is illustrated as blocking inflation fluid venting when the air bag reaches the large volume condition of FIG. 4, the vent 110 could be adapted to block inflation fluid venting when the air bag reaches any degree of air bag inflation between the small volume condition of FIG. 3 and the large volume condition of FIG. 4.

Figure 5:
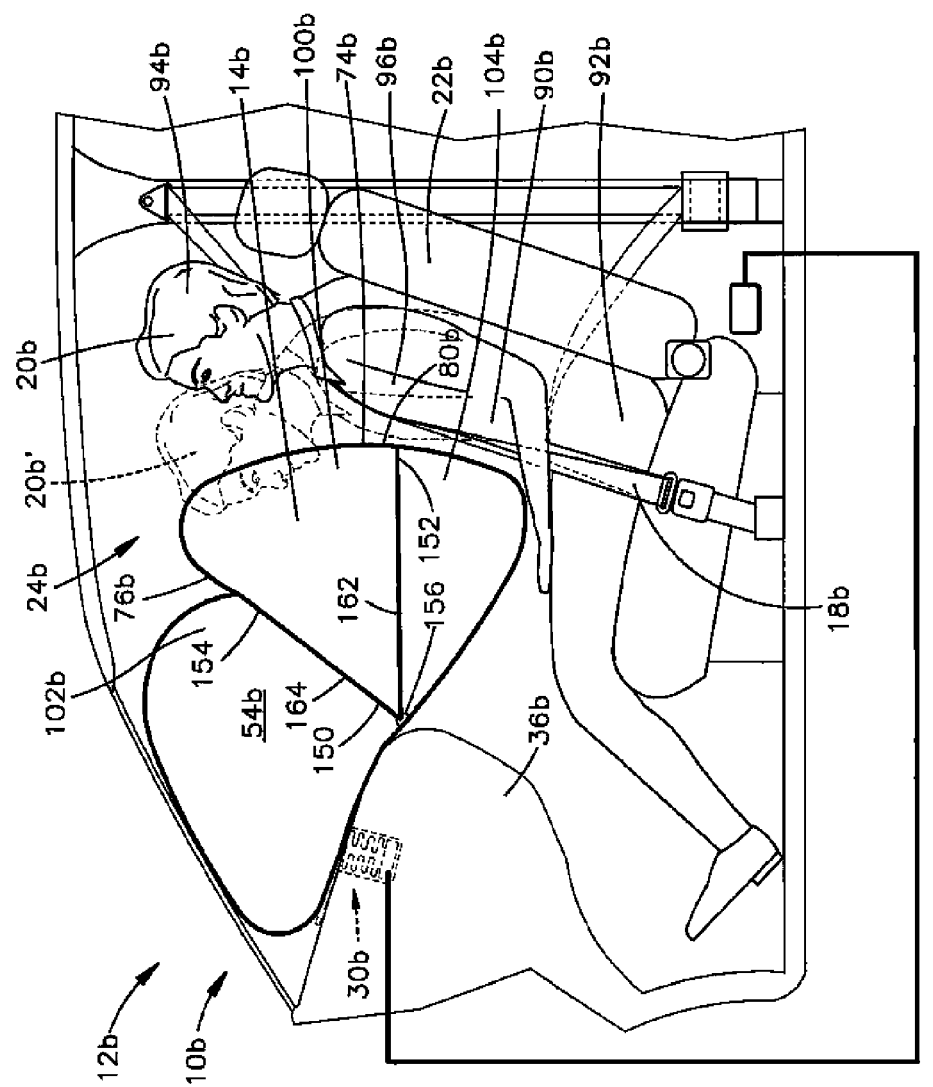
FIGS. 5 and 6 are schematic side views illustrating different conditions of an apparatus for helping to protect an occupant of a vehicle, according to a third embodiment of the invention.
Figure 6:
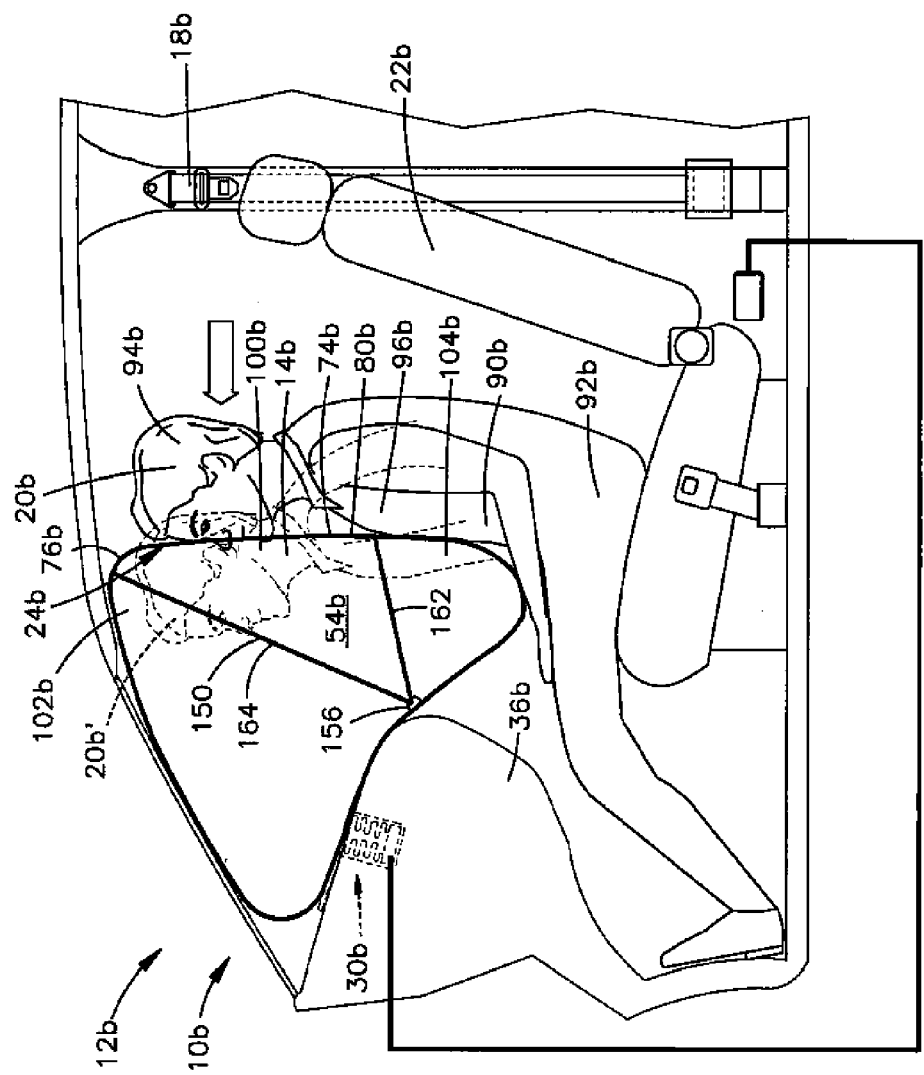

A third embodiment of the present invention is illustrated in FIGS. 5 and 6. Certain components in FIGS. 5 and 6 are similar or identical to components of FIGS. 1 and 2. The suffix "b" is added to the reference numbers of these similar or identical components in FIGS. 3 and 4 to avoid confusion.

Referring to FIGS. 5 and 6, an apparatus 10b for helping to protect an occupant 20b of a vehicle 12b includes an inflatable vehicle occupant protection device 14b in the form of an air bag. In the embodiment illustrated in FIGS. 5 and 6, the air bag 14b is a passenger frontal air bag for helping to protect an occupant 20b of a seat 22b on a passenger side 24b of the vehicle 12b. As shown in FIGS. 5 and 6, the vehicle 12b also includes a seatbelt 18b for helping to protect the vehicle occupant 20b.

The air bag 14b of the second embodiment may be similar or identical in construction and function to the air bag of the embodiment of the present invention illustrated in FIGS. 1 and 2. The air bag 14b of the second embodiment thus may be part of an air bag module 30b that is similar or identical in configuration and function to the module of the embodiment of FIGS. 1 and 2.

The air bag 14b also includes a tether 150 for adapting the configuration of the air bag 14b depending on vehicle or occupant conditions in the vehicle 12b. In the embodiment of FIGS. 5 and 6, the adaptive tether 150 comprises a single length of tether material that has a first end portion 152 secured to the air bag 14b, for example to a mid or lower portion 80b of a front panel 74b of the air bag. A second end portion 154 of the tether 150 is connected to an upper portion 76b of the front panel 74b of the air bag 14b. The tether 150 extends through a guide 156 on the air bag 14b. The guide 156 anchors the tether 150 to the air bag and permits the tether 150 to slide or otherwise move through its structure. The guide 156 may, for example, comprise a loop of material, such as air bag material, sewn or otherwise secured to a panel of the air bag 14b. The guide 156 divides the tether 150 into a first segment that serves as a trigger tether 162 and a second segment that serves as a shaping tether 164.

The mid/lower portion 80b of the front panel 74b to which the trigger tether 162 is connected has a large surface area and radius of curvature (see FIG. 5) compared to the surface area and radius of curvature of the upper portion 76b of the front panel (see FIG. 6) to which the shaping tether 164 is connected. The degree to which the surface area and radius of curvature of the upper portion 76b is smaller than that of the mid/lower portion 80b may be several fold. For the construction illustrated in FIGS. 5 and 6, the mid/lower portion 80b of the front panel 74b exerts a force on the trigger tether 162 that is greater than the force exerted on the shaping tether 164 by the upper portion 76b of the front panel.

When the air bag 14b inflates and deploys, the gas pressure in the bag acts normal to the surface of the panels defining the inflatable volume 54b of the bag. The gas pressure in the air bag 14b, acting on the comparatively large surface area of the mid/lower portion 80b, exerts a correspondingly large force on the trigger tether 162. Conversely, the gas pressure acting on the comparatively small surface area of the upper portion 76b exerts a correspondingly small force on the shaping tether 164. As a result, the force urged on the shaping tether 164 by the upper portion 76b is substantially overcome by the tensioned trigger tether 162. Because of this, as shown in FIG. 5, the mid/lower portion 80b pulls the tether 150 through the guide 156, lengthening the trigger tether 162 and shortening the shaping tether 164. As a result, the shaping tether 164 restricts deployment of the upper portion 76b, thus giving the air bag 14b the shape illustrated in FIG. 5.

According to the present invention, the adaptive tether 150 is responsive to vehicle conditions, occupant conditions, or both vehicle conditions and occupant conditions to adapt the inflated condition of the air bag 14b. Particularly, the tether 150 may adapt the inflation, deployment, configuration, shape, pressurization, or a combination thereof, of the air bag 14b. According to the embodiment of FIGS. 5 and 6, this control is implemented passively through the physical construction and configuration of the air bag 14b and the adaptive tether 150.

In particular, in the embodiment of FIGS. 5 and 6, the air bag 14b and adaptive tether 150 are constructed, configured, and arranged to adapt the inflated condition of the air bag 14b depending on whether the occupant 20b is restrained by the seatbelt 18b at the time that the air bag 14b is deployed. This is beneficial because, as described above in regard to the previous embodiments and the data shown in FIG. 11, an unbelted occupant will penetrate into the air bag 14b to a greater extent and at a different location on the bag than a belted occupant.

As shown in FIG. 5, in the case of a belted occupant 20b, the seatbelt 18b serves to help restrain the occupant 20b. As a result, the belted occupant 20b, especially the occupant's lower torso 90b and hips 92b are restrained from moving toward the instrument panel 36b. This allows the air bag 14b to inflate and deploy with comparatively little resistance or inhibition from the occupant 20b. As shown in dashed lines at 20b', the belted occupant's head 94b and upper torso 96b penetrate into a middle portion 100b of the air bag 14b. The middle portion 100b is positioned below an upper portion 102b of the air bag in the area where the end portion 154 of the shaping tether 164 is connected to the front panel 74b. The middle portion 100b is also positioned above a lower portion 104b of the air bag 14b, in the area where the end portion 152 of the trigger tether 162 is connected to the front panel 74b. As shown in FIG. 5, the degree or distance to which the occupant 20b' penetrates into the air bag 14b may be comparatively or relatively small.

As shown in FIG. 6, in the case of an unbelted occupant 20b, the seatbelt 18b does not help restrain the occupant 20b. As a result, the unbelted occupant 20b, including the occupant's lower torso 90b and hips 92b, are not restrained from moving toward the instrument panel 36b. Thus, as the air bag 14b inflates and deploys in response to the vehicle impact, the occupant's entire body moves unrestrained toward the instrument panel 36b. As shown in dashed lines at 20b', when this occurs, the unbelted occupant 20b may also move upward as the occupant moves toward the instrument panel 36b. This can occur for several reasons. The seat bottom may be inclined upward from rear to front, so the occupant 20b, moving forward on the seat bottom, also moves upward. Also, the occupant 20b, in moving forward, may also move from a reclined position to an upright position. Further, the occupant 20b may move upward off the seat as he or she moves forward in the vehicle.

As shown in dashed lined in FIG. 6, the occupant's head 94b penetrates into the upper portion 102b of the air bag 14b. The occupant's upper torso 96b penetrates into the middle portion 100b of the air bag 14b. The occupant's lower torso 90b penetrates into the lower portion 104b of the air bag 14b. As shown in FIG. 6, the degree or distance to which the occupant 20b' penetrates into the air bag 14b may be comparatively or relatively large or substantial when viewed in comparison with the belted occupant (see FIG. 5).

From the above, those skilled in the art will appreciate that the tether 150 of the embodiment of FIGS. 5 and 6 tailors the inflated condition of the air bag 14b in response to the buckled status of the vehicle occupant 20b. In the case of the buckled occupant 20b, the tether 150 maintains the basic configuration illustrated in FIG. 5, restraining the upper portion 102b from deploying fully while permitting the lower portion 104b to deploy fully. As a result, the air bag 14b is initially deployed and maintained in configuration of FIG. 5, which is a low volume configuration in comparison with the configuration of FIG. 6. The low volume configuration of the air bag 14b in FIG. 5 requires a lesser volume of inflation fluid in order to achieve the desired inflation, deployment, and pressurization characteristics. This can help reduce the required size and cost of the inflator and also helps ensure reliability in inflation and deployment. Since the unbuckled occupant is the worst case scenario, the inflator is sized to provide a volume of inflation fluid sufficient to inflate, deploy, and pressurize the air bag 14b to the large volume inflated condition of FIG. 6 within the desired performance parameters. This being the case, the volume of inflation fluid delivered by the inflator is certainly sufficient to inflate, deploy, and pressurize the air bag 14b to the small volume inflated condition of FIG. 5 within the desired performance parameters. Since the buckled occupant is the expected condition, the tether configuration of FIGS. 5 and 6 helps bolster the reliability of the apparatus.

In the case of the unbuckled occupant 20b, the air bag 14b initially inflates toward the configuration where the tether 150 maintains the basic configuration illustrated in FIG. 5. The unbelted occupant 20b, however, being unrestrained by the seatbelt 18b, moves into engagement with the lower portion 104b, moves the lower portion toward the instrument panel 36b, thus relieving the force exerted on the trigger tether 162 by the mid/lower portion 80b of the front panel 74b. As a result, the tether 150 moves through the guide 156, thus shortening the trigger tether 162 and lengthening the shaping tether 164, thereby releasing the upper portion 102b of the air bag 14b to deploy fully to the position illustrated in FIG. 6. The upper portion 102b, when in this position, is positioned to receive and cushion the unbelted occupant 20b'. Those skilled in the art will appreciate that the degree to which the tether 150 releases the upper portion 102b of the air bag to deploy is proportional to the degree to which the occupant 20b penetrates the air bag 14b.

Those skilled in the art will thus appreciate that, advantageously, the tether 150 of the present invention adapts the configuration of the air bag 14b depending on whether the occupant 20b is restrained by the seatbelt 18b. The tether 150 tailors the configuration of the air bag 14b so that the air bag has a comparatively small volume while covering the space where the buckled occupant 20b (FIG. 5) strikes the air bag. Also, the tether 150 tailors the configuration of the air bag 14b so that the air bag has a comparatively large volume while covering the space where the unbuckled occupant 20b (FIG. 6) strikes the air bag.

Figure 7:
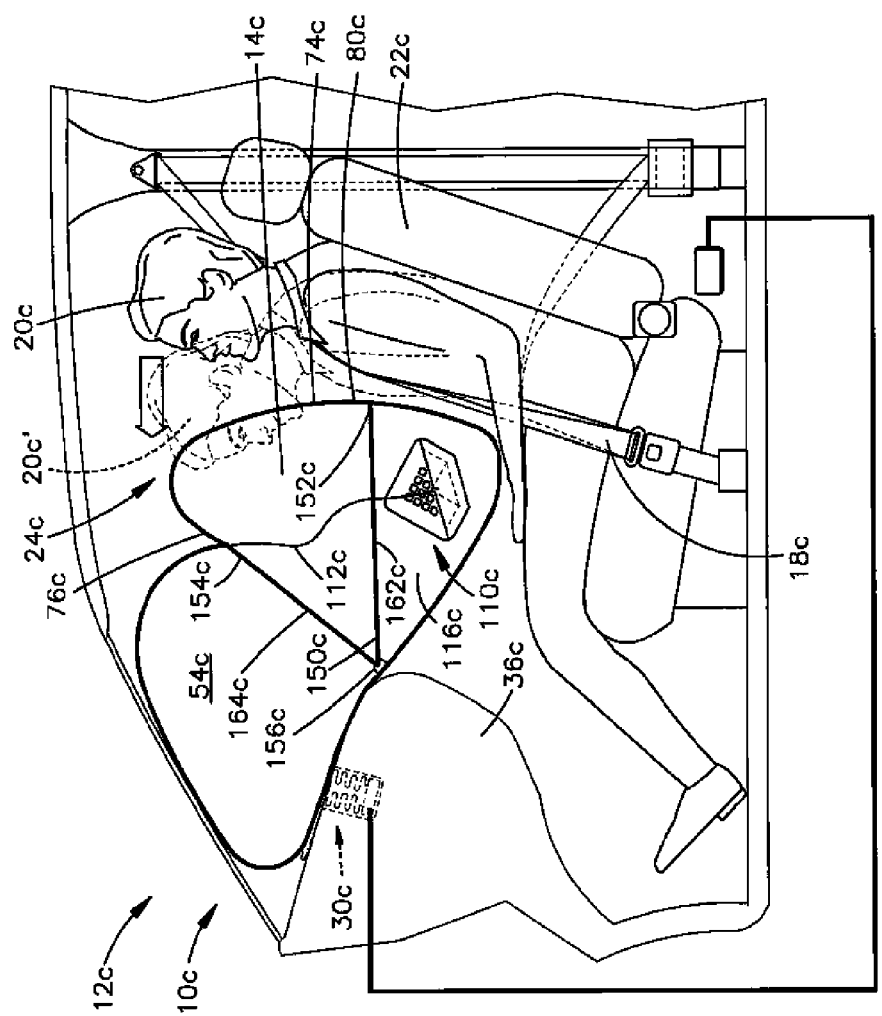
FIGS. 7 and 8 are schematic side views illustrating different conditions of an apparatus for helping to protect an occupant of a vehicle, according to a fourth embodiment of the invention.
Figure 8:
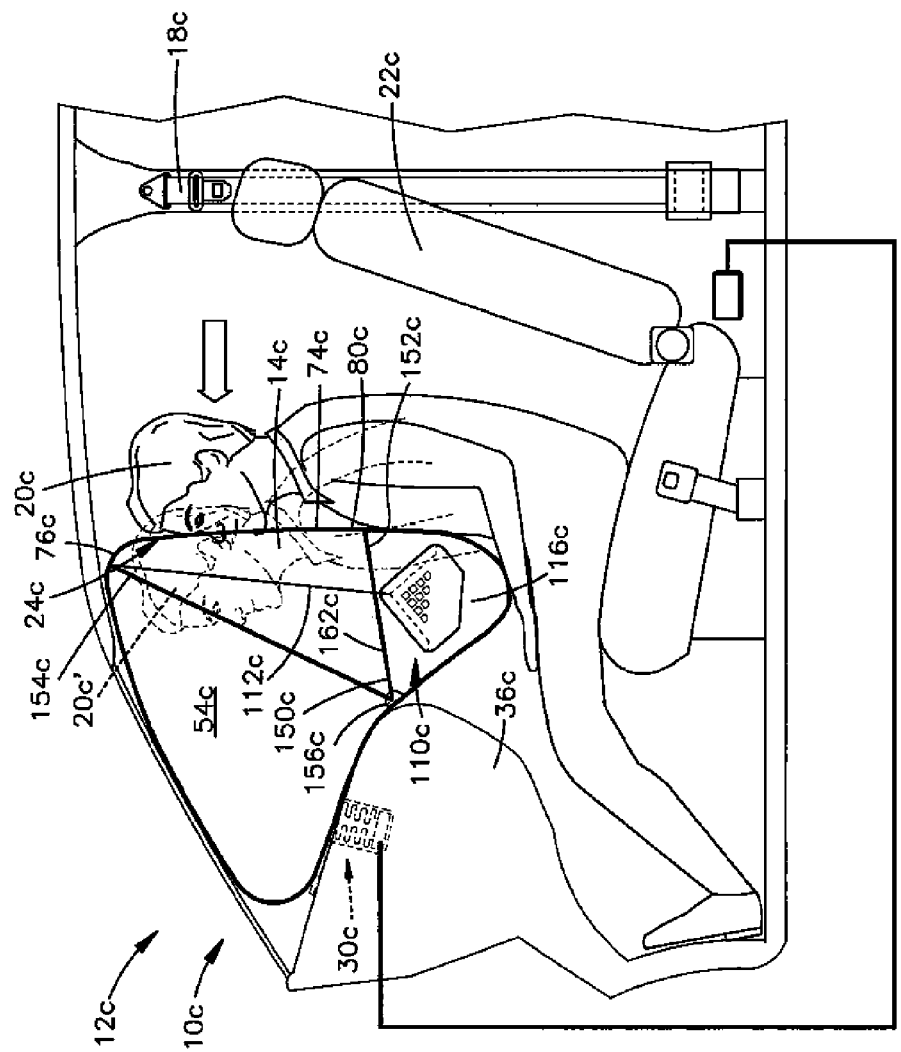

A fourth embodiment of the present invention is illustrated in FIGS. 7 and 8. Certain components in FIGS. 7 and 8 are similar or identical to components of FIGS. 5 and 6. The suffix "c" is added to the reference numbers of these similar or identical components in FIGS. 7 and 8 to avoid confusion. The embodiment of FIGS. 7 and 8 combines the adaptive tether of the embodiment of FIGS. 5 and 6 with the adaptive vent of the embodiment of FIGS. 3 and 4.

Referring to FIGS. 7 and 8, an apparatus 10c for helping to protect an occupant 20c of a vehicle 12c includes an inflatable vehicle occupant protection device 14c in the form of an air bag. In the embodiment illustrated in FIGS. 7 and 8, the air bag 14c is a passenger frontal air bag for helping to protect an occupant 20c of a seat 22c on a passenger side 24c of the vehicle 12c. As shown in FIGS. 7 and 8, the vehicle 12c also includes a seatbelt 18c for helping to protect the vehicle occupant 20c.

The air bag 14c of the second embodiment may be similar or identical in construction and function to the air bag of the embodiment of the present invention illustrated in FIGS. 5 and 6. The air bag 14c of the second embodiment thus may be part of an air bag module 30c that is similar or identical in configuration and function to the module of the embodiment of FIGS. 5 and 6. The air bag 14c also includes a tether 150c for adapting the configuration of the air bag 14c depending on vehicle or occupant conditions. In the embodiment of FIGS. 7 and 8, the adaptive tether 150c is similar or identical in construction, configuration, and function to the tether disclosed in FIGS. 5 and 6.

The tether 150c comprises a single length of tether material that has a first end portion 152c secured to the air bag 14c, for example to a mid or lower portion 80c of a front panel 74c of the air bag. A second end portion 154c of the tether 150c is connected to an upper portion 76c of the front panel 74c of the air bag 14c. The tether 150c extends through a guide 156c on the air bag 14c. The guide 156c anchors the tether 150c to the air bag and permits the tether 150c to slide or otherwise move through its structure. The guide 156c may, for example, comprise a loop of material, such as air bag material, sewn or otherwise secured to a panel of the air bag 14c. The guide 156c divides the tether 150c into a first segment that serves as a trigger tether 162c and a second segment that serves as a shaping tether 164c.

The adaptive tether 150c of the embodiment of FIGS. 7 and 8 is responsive to vehicle conditions, occupant conditions, or both vehicle conditions and occupant conditions to adapt the inflated condition of the air bag 14c. Particularly, the tether 150c may adapt the inflation, deployment, configuration, shape, pressurization, or a combination thereof, of the air bag 14c passively, in a manner that is similar or identical to the embodiment of FIGS. 5 and 6. In particular, in the embodiment of FIGS. 7 and 8, the air bag 14c and adaptive tether 150c are constructed, configured, and arranged to adapt the inflated condition of the air bag 14c depending on whether the occupant 20c is restrained by the seatbelt 18c at the time that the air bag 14c is deployed.

The air bag 14c of the embodiment of FIGS. 7 and 8 also includes a vent 110c that is selectively actuatable to release inflation fluid from the inflatable volume 54c of the air bag 14c. The vent 110c may be similar or identical in construction, configuration, and function to the vent of the embodiment of FIGS. 3 and 4. The vent 110c includes an adaptive vent tether 112c that is operative to actuate the vent 110c in response to vehicle and occupant conditions at the time the air bag is deployed. The vent 110c thus may selectively release inflation fluid from the air bag 14c depending on these conditions. More particularly, the vent 110c is constructed and arranged to adapt to whether the occupant 20c is belted or un-belted at the time of an event for which inflation of the air bag 14c is desired. This is because the vent tether 112c, being connected to the upper portion 76c of the front panel 74c at or near the connection of the shaping tether 164c, is configured to become tensioned in response to deployment of the upper portion.

According to the embodiment of FIGS. 7 and 8, the vent 110c remains open and vents inflation fluid from the inflatable volume 54c in response to a belted occupant 20c (FIG. 7). Maintaining the vent 110c in the open condition in the case of the belted occupant 20c may be desirable. For example, since the belted occupant 20c is restrained by the seatbelt 18c, it may be desirable to provide a lower degree of air bag pressurization to produce the necessary degree of energy dissipation and absorption.

Additionally, according to the embodiment of FIGS. 7 and 8, the vent 110c closes and blocks inflation fluid from venting from the inflatable volume 54c in response to an un-belted occupant 20c (FIG. 8). Maintaining the vent 110c in the closed condition in the case of the un-belted occupant 20c may also be desirable. For example, since the un-belted occupant 20c is not restrained by the seatbelt 18c, it may be desirable to provide a higher degree of air bag pressurization to produce the necessary degree of energy dissipation and absorption.

As a further advantage, by adjusting the relative lengths of the adaptive tether 150c and the vent tether 112c or by adjusting the relative positions at which the adaptive tether and vent tether are connected to the air bag 14c, the air bag can be adapted to vent inflation fluid from the air bag when the bag is at a predetermined shape defined by the shaping tether 164c. For example, the relative lengths of the tethers 150c and 112c, the relative positions at which the tethers are connected to the air bag 14c, or both the relative lengths and connection positions of the tethers could be adapted such that the vent 110c blocks inflation fluid venting at any time before or up to the time that the air bag reaches the fully inflated and deployed condition of FIG. 8. Therefore, although the vent 110c is illustrated as blocking inflation fluid venting when the air bag reaches the large volume condition of FIG. 8, the vent 110c could be adapted to block inflation fluid venting when the air bag reaches any degree of air bag inflation between the small volume condition of FIG. 7 and the large volume condition of FIG. 8.

From the above, those skilled in the art will appreciate that, according to the present invention, the adaptive tether 150c and the vent 110c in combination act to shape the air bag 14c and vent inflation fluid from the air bag in the event of a belted occupant 20c, and act to shape the air bag and block inflation fluid venting in the event of an un-belted occupant. Advantageously, the adaptive shaping and venting achieved through the adaptive tether 150c and vent 110c are controlled passively and respond without the need to actively monitor the occupant or vehicle and without the need to actively actuate the tether or vent. The adaptive tether 150c and vent 110c respond to air bag deployment and the manner in which the occupant 20c strikes the bag.

Figure 9:
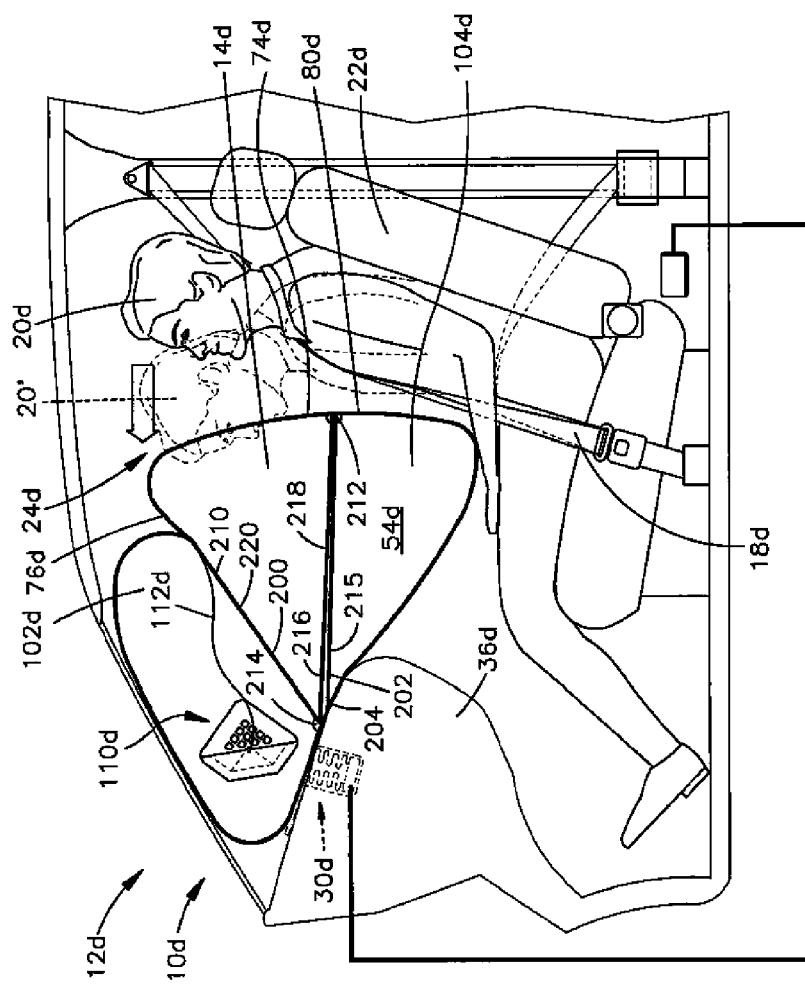
FIGS. 9 and 10 are schematic side views illustrating different conditions of an apparatus for helping to protect an occupant of a vehicle, according to a fifth embodiment of the invention.
Figure 10:
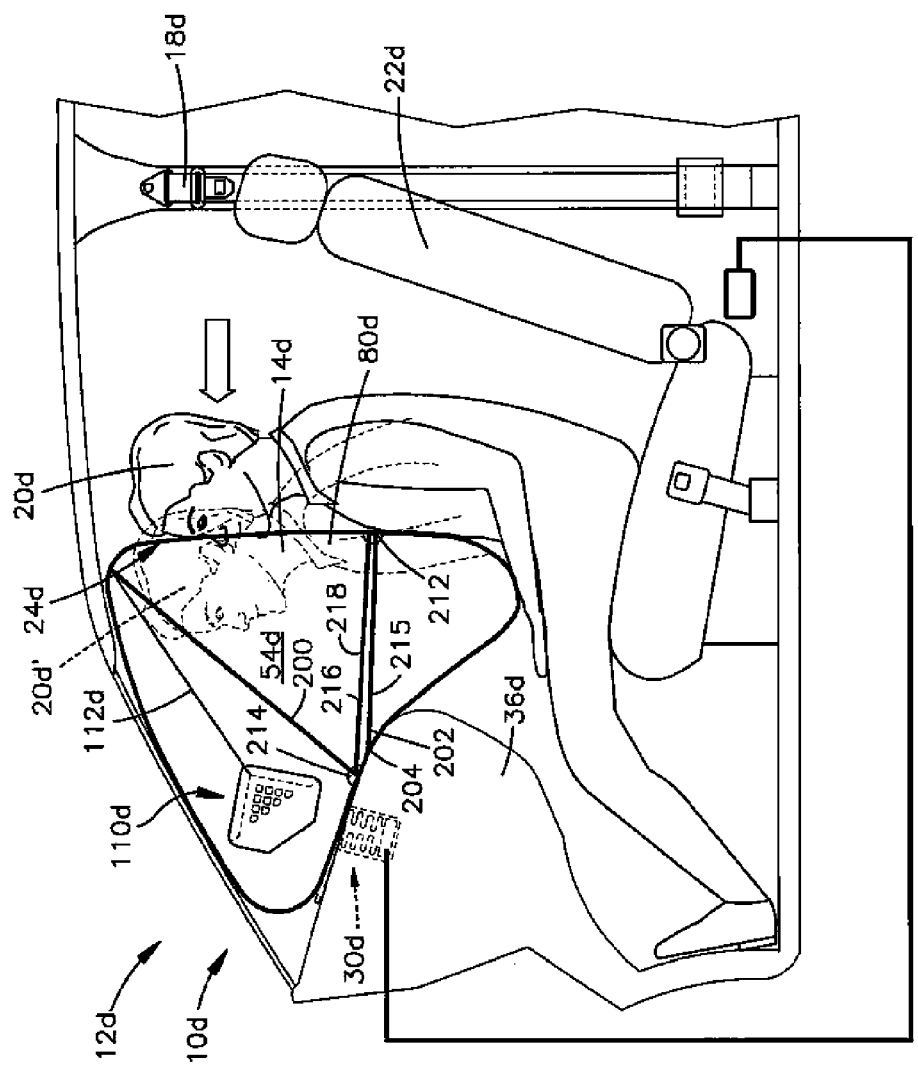

A fifth embodiment of the present invention is illustrated in FIGS. 9 and 10. Certain components in FIGS. 9 and 10 are similar or identical to components of FIGS. 7 and 8. The suffix "d" is added to the reference numbers of these similar or identical components in FIGS. 9 and 10 to avoid confusion. The embodiment of FIGS. 9 and 10 includes an adaptive tether and an adaptive vent, both of which are similar to those of the embodiment of FIGS. 7 and 8.

Referring to FIGS. 9 and 10, an apparatus 10d for helping to protect an occupant 20d of a vehicle 12d includes an inflatable vehicle occupant protection device 14d in the form of an air bag. In the embodiment illustrated in FIGS. 9 and 10, the air bag 14d is a passenger frontal air bag for helping to protect an occupant 20d of a seat 22d on a passenger side 24d of the vehicle 12d. As shown in FIGS. 7 and 8, the vehicle 12d also includes a seatbelt 18d for helping to protect the vehicle occupant 20d.

The air bag 14d of the fifth embodiment may be similar or identical in construction and function to the air bag of the embodiment of the present invention illustrated in FIGS. 5 and 6. The air bag 14d of the fifth embodiment thus may be part of an air bag module 30d that is similar or identical in configuration and function to the module of the embodiment of FIGS. 7 and 8. The air bag 14d also includes a tether 200 for adapting the configuration of the air bag 14d depending on vehicle or occupant conditions. In the embodiment of FIGS. 9 and 10, the adaptive tether 200 is similar to the tether disclosed in FIGS. 7 and 8.

The tether 200 comprises a single length of material that has a first end portion 202 secured to the air bag 14d, for example at a location 204 adjacent the instrument panel 36d of the air bag. A second end portion 210 of the tether 200 is connected to an upper portion 76d of the front panel 74d of the air bag 14d. The tether 200 extends through a first guide 212 on the air bag 14d at a location such as the mid/lower portion 80d of the front panel 74d. The tether 200 also extends through a second guide 214 on the air bag 14d at a location such as adjacent or near the location 204. The first and second guides 212 and 214 anchor the tether 200 to the air bag and permit the tether 200 to slide or otherwise move through their respective structures. The guides 212 and 214 may, for example, comprise loops of material, such as air bag material, sewn or otherwise secured to respective panels of the air bag 14d. The guide 156d divides the tether 200 into segments: first and second segments 215 and 216 that together serve as a trigger tether 218 and a third segment that serves as a shaping tether 220.

The adaptive tether 200 of the embodiment of FIGS. 9 and 10 is responsive to vehicle conditions, occupant conditions, or both vehicle conditions and occupant conditions to adapt the inflated condition of the air bag 14d. Particularly, the tether 200 may adapt the inflation, deployment, configuration, shape, pressurization, or a combination thereof, of the air bag 14d passively, in a manner that is similar to the embodiment of FIGS. 7 and 8. In the embodiment of FIGS. 9 and 10, the air bag 14d and adaptive tether 200 are constructed, configured, and arranged to adapt the inflated condition of the air bag 14d depending on whether the occupant 20d is restrained by the seatbelt 18d at the time that the air bag 14d is deployed.

The mid/lower portion 80d of the front panel 74d to which the trigger tether 218 is connected has a large surface area and radius of curvature (see FIG. 9) compared to the upper portion 76d of the front panel to which the shaping tether 220 is connected. The degree to which the surface area and radius of curvature of the upper portion 76d (see FIG. 10) is smaller than that of the mid/lower portion 80d may be several fold. For the construction illustrated in FIGS. 9 and 10, the mid/lower portion 80d of the front panel 74d exerts a force on the trigger tether 218 that is greater than the force exerted on the shaping tether 220 by the upper portion 76d of the front panel.

When the air bag 14d inflates and deploys, the gas pressure in the bag acts normal to the surface of the panels defining the inflatable volume 54d of the bag. The gas pressure in the air bag 14d, acting on the comparatively large surface area of the mid/lower portion 80d, exerts a correspondingly large force on the trigger tether 218. Conversely, the gas pressure acting on the comparatively small surface area of the upper portion 76d exerts a correspondingly small force on the shaping tether 220. As a result, the force urged on the shaping tether 220 by the upper portion 76d is substantially overcome by the tensioned trigger tether 218. Because of this, as shown in FIG. 9, the mid/lower portion 80d pulls the tether 200 through the guides 212 and 214, lengthening the trigger tether 218 and shortening the shaping tether 220. As a result, the shaping tether 220 restricts deployment of the upper portion 76d, thus giving the air bag 14d the shape illustrated in FIG. 9.

The tether 200 of the embodiment of FIGS. 9 and 10 tailors the inflated condition of the air bag 14d in response to the buckled status of the vehicle occupant 20d. In the case of the buckled occupant 20d, the tether 200 maintains the basic configuration illustrated in FIG. 9, restraining the upper portion 102d from deploying fully while permitting the lower portion 104d to deploy fully. As a result, the air bag 14d is initially deployed and maintained in configuration of FIG. 9, which is a low volume configuration in comparison with the configuration of FIG. 10. The low volume configuration of the air bag 14d in FIG. 9 requires a lesser volume of inflation fluid in order to achieve the desired inflation, deployment, and pressurization characteristics. This can help reduce the required size and cost of the inflator and also helps ensure reliability in inflation and deployment. Since the unbuckled occupant is the worst case scenario, the inflator is sized to provide a volume of inflation fluid sufficient to inflate, deploy, and pressurize the air bag 14d to the large volume inflated condition of FIG. 10 within the desired performance parameters. This being the case, the volume of inflation fluid delivered by the inflator is certainly sufficient to inflate, deploy, and pressurize the air bag 14d to the small volume inflated condition of FIG. 9 within the desired performance parameters. Since the buckled occupant is the expected condition, the tether configuration of FIGS. 9 and 10 helps bolster the reliability of the apparatus.

In the case of the unbuckled occupant 20d, the air bag 14d initially inflates toward the configuration where the tether 200 maintains the basic configuration illustrated in FIG. 9. The unbelted occupant 20d, however, being unrestrained by the seatbelt 18d, moves into engagement with the lower portion 104d, moves the lower portion toward the instrument panel 36d, thus relieving the force exerted on the trigger tether 218 by the mid/lower portion 80d of the front panel 74d. As a result, the tether 200 moves through the guides 212 and 214, thus shortening the trigger tether 218 and lengthening the shaping tether 220, thereby releasing the upper portion 102d of the air bag 14d to deploy fully to the position illustrated in FIG. 10. The upper portion 102d, when in this position, is positioned to receive and cushion the unbelted occupant 20d'. Those skilled in the art will appreciate that the degree to which the tether 200 releases the upper portion 102d of the air bag to deploy is proportional to the degree to which the occupant 20d penetrates the air bag 14d.

Those skilled in the art will thus appreciate that, advantageously, the tether 200 of the present invention adapts the configuration of the air bag 14d depending on whether the occupant 20d is restrained by the seatbelt 18d. The tether 200 tailors the configuration of the air bag 14d so that the air bag has a comparatively small volume while covering the space where the buckled occupant 20d (FIG. 9) strikes the air bag. Also, the tether 200 tailors the configuration of the air bag 14d so that the air bag has a comparatively large volume while covering the space where the unbuckled occupant 20d (FIG. 10) strikes the air bag.

In the embodiment of FIGS. 9 and 10, the inclusion of the first and second guides 212 and 214 configures the tether 200 to tailor the shape of the air bag 14d in a manner different than the single guide embodiments of FIGS. 5-8. The two-guide configuration effectively doubles the length of the shaping tether 220 that is taken up due to the front panel 74d moving in the deployment direction and tensioning the trigger tether 218. Similarly, the two-guide configuration effectively doubles the length of the shaping tether 220 that is released due to the occupant 20d moving the front panel 74d against the deployment direction and toward the instrument panel 36d. The two-guide configuration of FIGS. 9 and 10 thus reduces the extent to which the upper portion 76d is restricted from deploying in the case of the belted occupant 20d (see FIG. 9).

The air bag 14d of the embodiment of FIGS. 9 and 10 also includes a vent 110d that is selectively actuatable to release inflation fluid from the inflatable volume 54d of the air bag 14d. In the embodiment of FIGS. 9 and 10, the tether 200 functions separately and independently of the vent 110d. The tether 200 of FIGS. 9 and 10 functions as described above regardless of whether the air bag 14d includes the vent 110d. The vent 110d is therefore an optional feature of the air bag 14d. The air bag 14d of the embodiment of FIGS. 9 and 10 thus may or may not include the vent 110d.

The vent 110d may be similar or identical in construction, configuration, and function to the vent of the embodiment of FIGS. 7 and 8. In the embodiment of FIGS. 9 and 10, the vent 110d is positioned at a different location on the air bag 14d than in the previous embodiments (see FIGS. 3-4 and 7-8), but is oriented to operate similarly or identically to those embodiments. The vent 110d includes an adaptive vent tether 112d that is operative to actuate the vent 110d in response to vehicle and occupant conditions at the time the air bag is deployed. The vent 110d thus may selectively release inflation fluid from the air bag 14d depending on these conditions. More particularly, the vent 110d is constructed and arranged to adapt to whether the occupant 20d is belted or un-belted at the time of an event for which inflation of the air bag 14d is desired. This is because the vent tether 112d, being connected to the upper portion 76d of the front panel 74d at or near the connection of the shaping tether 220, is configured to become tensioned in response to deployment of the upper portion.

According to the embodiment of FIGS. 9 and 10, the vent 110d remains open and vents inflation fluid from the inflatable volume 54d in response to a belted occupant 20d (FIG. 9). Maintaining the vent 110d in the open condition in the case of the belted occupant 20d may be desirable. For example, since the belted occupant 20d is restrained by the seatbelt 18d, it may be desirable to provide a lower degree of air bag pressurization to produce the necessary degree of energy dissipation and absorption.

Additionally, according to the embodiment of FIGS. 9 and 10, the vent 110d closes and blocks inflation fluid from venting from the inflatable volume 54d in response to an un-belted occupant 20d (FIG. 10). Maintaining the vent 110d in the closed condition in the case of the un-belted occupant 20d may also be desirable. For example, since the un-belted occupant 20d is not restrained by the seatbelt 18d, it may be desirable to provide a higher degree of air bag pressurization to produce the necessary degree of energy dissipation and absorption.

As a further advantage, by adjusting the relative lengths of the adaptive tether 200 and the vent tether 112d or by adjusting the relative positions at which the adaptive tether and vent tether are connected to the air bag 14d, the air bag can be adapted to vent inflation fluid from the air bag when the bag is at a predetermined shape defined by the shaping tether 220. For example, the relative lengths of the tethers 200 and 112d, the relative positions at which the tethers are connected to the air bag 14d, or both the relative lengths and connection positions of the tethers could be adapted such that the vent 110d blocks inflation fluid venting at any time before or up to the time that the air bag reaches the fully inflated and deployed condition of FIG. 10. Therefore, although the vent 110d is illustrated as blocking inflation fluid venting when the air bag reaches the large volume condition of FIG. 10, the vent 110d could be adapted to block inflation fluid venting when the air bag reaches any degree of air bag inflation between the small volume condition of FIG. 9 and the large volume condition of FIG. 10.

From the above, those skilled in the art will appreciate that, according to the present invention, the adaptive tether 200 and the vent 110d in combination act to shape the air bag 14d and vent inflation fluid from the air bag in the event of a belted occupant 20d, and act to shape the air bag and block inflation fluid venting in the event of an un-belted occupant. Advantageously, the adaptive shaping and venting achieved through the adaptive tether 200 and vent 110d are controlled passively and respond without the need to actively monitor the occupant or vehicle and without the need to actively actuate the tether or vent. The adaptive tether 200 and vent 110d respond to air bag deployment and the manner in which the occupant 20d strikes the bag.

Figure 15:
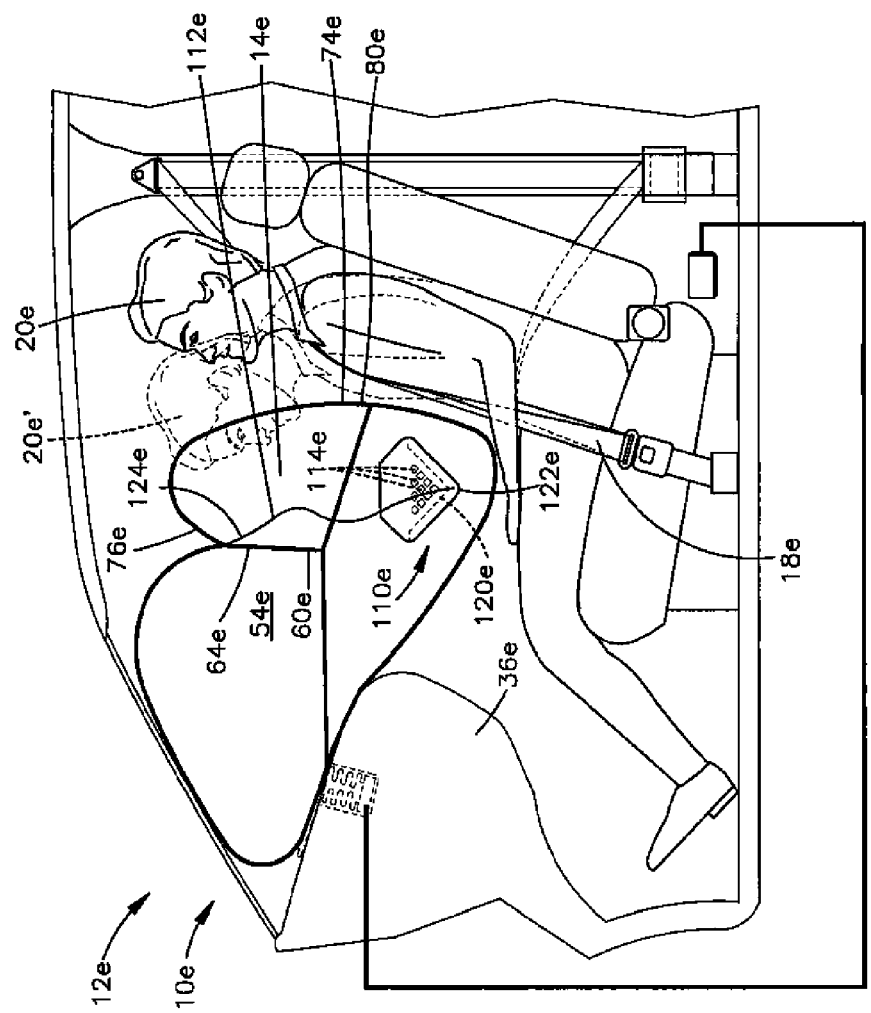
FIGS. 15 and 16 are schematic side views illustrating different conditions of an apparatus for helping to protect an occupant of a vehicle, according to a sixth embodiment of the invention.
Figure 16:
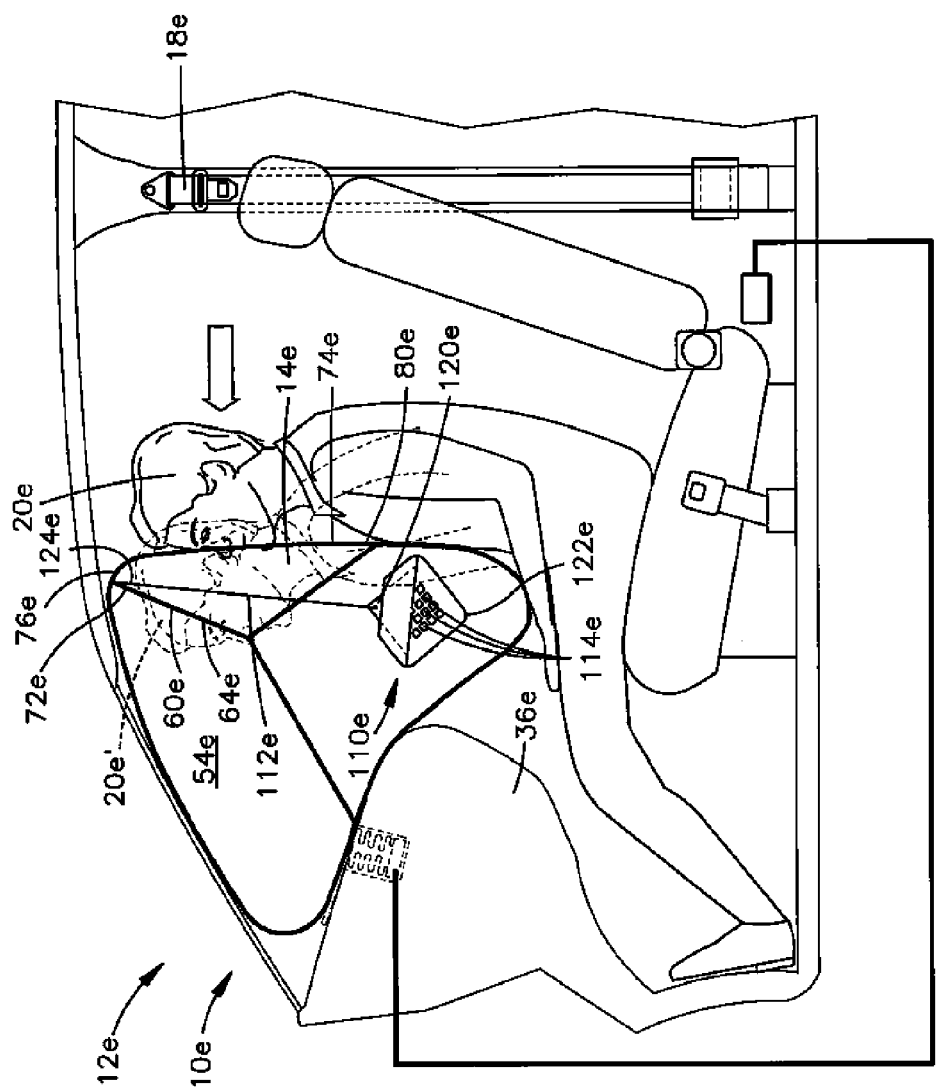

A sixth embodiment of the present invention is illustrated in FIGS. 15 and 16. Certain components in FIGS. 15 and 16 are similar or identical to components of FIGS. 3 and 4. The suffix "e" is added to the reference numbers of these similar or identical components in FIGS. 15 and 16 to avoid confusion. The embodiment of FIGS. 15 and 16 includes an adaptive tether and an adaptive vent, both of which are similar to those of the embodiment of FIGS. 3 and 4. The difference between the embodiment of FIGS. 15 and 16 and the embodiment of FIGS. 3 and 4 is that vent in the embodiment of FIGS. 15 and 16 is adapted to open instead of close in response to occupant penetration.

The apparatus 10e of FIGS. 15 and 16 includes an adaptive vent 110e for helping to protect an occupant 20e of the vehicle 12e. The vent 110e of FIGS. 15 and 16 is similar or identical to the vent in FIGS. 3 and 4, except that the vent 110e of FIGS. 15 and 16 is initially closed and adapted to open in response to whether the occupant 20e is belted or un-belted at the time of an event for which inflation of the air bag 14e is desired. As shown in FIGS. 15 and 16, the vent 110e has essentially the same construction as that shown in FIGS. 3 and 4. In the embodiment of FIGS. 15 and 16, however, the orientation of the vent 110e is essentially rotated 180 degrees.

This orientation allows the vent 110e to be initially closed prior to inflation and deployment of the air bag 14e. In this configuration, the vent door 120e is held initially in the closed condition (see FIG. 15) by means (not shown) such as tear stitching or a releasable adhesive. The vent tether 112e has a first end portion 122e secured to the vent door 120e and a second end portion 124e secured to the air bag 14e. In the embodiment of FIGS. 15 and 16, the second end portion 124e is secured to the upper portion 76e of the front panel 74e of the air bag 14e at or near the location where the end portion of the shaping tether 64e is connected to the upper portion.

The vent 110e has a closed condition (FIG. 15) in which the vent door 120e covers the vent openings 114e and thereby blocks inflation fluid from venting, i.e., flowing, through the vent openings. In the closed condition, the vent door 120e is held in place by releasable means (not shown), such as tear stitching. When tension on the vent tether 112e reaches a threshold magnitude, the tear stitching ruptures, which releases the vent door 120e to move to the open condition illustrated in FIG. 16. In the open condition, the vent door 120e is positioned away from the vent openings 114e and thereby permits inflation fluid to vent, i.e., flow, through the vent openings. In the open condition, the vent door 120e is folded away from the vent openings 114e and held in this position by the tension on the vent tether 112e.

According to the embodiment of FIGS. 15 and 16, the vent 110e remains closed and blocks inflation fluid from venting from the inflatable volume 54e in response to a belted occupant 20e (FIG. 15). Maintaining the vent 110e in the closed condition in the case of the belted occupant 20e may be desirable. For example, since the belted occupant 20e is restrained by the seatbelt 18e, it may be desirable to provide a higher degree of air bag pressurization since the seatbelt 18e will aid in energy dissipation.

Additionally, according to the embodiment of FIGS. 15 and 16, the vent 110e closes and blocks inflation fluid from venting from the inflatable volume 54e in response to an un-belted occupant 20e (FIG. 16). Maintaining the vent 110e in the closed condition in the case of the un-belted occupant 20e may also be desirable. For example, since the un-belted occupant 20e is not restrained by the seatbelt 18e, it may be desirable to provide a higher degree of air bag pressurization to produce the necessary degree of energy dissipation and absorption.

From the above, those skilled in the art will appreciate that, according to the present invention, the adaptive tether 60e and the vent 110e in combination act to shape the air bag 14e and block inflation fluid venting in the event of a belted occupant 20e, and act to shape the air bag and vent inflation fluid in the event of an un-belted occupant. Advantageously, the adaptive shaping and venting achieved through the adaptive tether 60e and vent 110e are controlled passively and respond without the need to actively monitor the occupant or vehicle and without the need to actively actuate the tether or vent. The adaptive tether 60e and vent 110e respond to air bag deployment and the manner in which the occupant 20e strikes the bag.

As another advantage, by adjusting the relative lengths of the adaptive tether 60e and the vent tether 112e or by adjusting the relative positions at which the adaptive tether and vent tether are connected to the air bag 14e, the air bag can be adapted to vent or block venting of inflation fluid from the air bag when the bag is at a predetermined shape defined by the shaping tether 64e. For example, the relative lengths of the tethers 60e and 112e, the relative positions at which the tethers are connected to the air bag 14e, or both the relative lengths and connection positions of the tethers could be adapted such that the vent 110e opens and vents inflation fluid at any time before or up to the time that the air bag reaches the fully inflated and deployed condition of FIG. 16. Therefore, although the vent 110e is illustrated as venting inflation fluid when the air bag reaches the large volume condition of FIG. 16, the vent 110e could be adapted to begin inflation fluid venting when the air bag reaches any degree of air bag inflation between the small volume condition of FIG. 15 and the large volume condition of FIG. 16.

Figure 17:
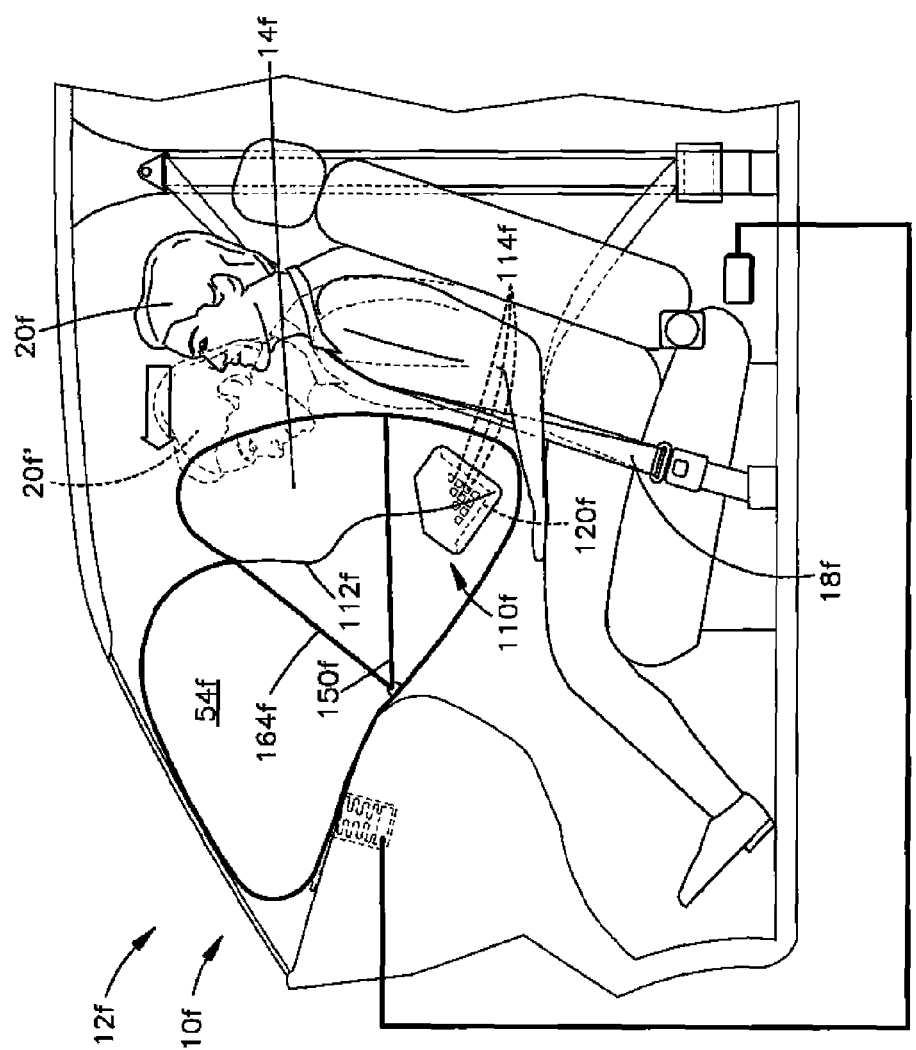
FIGS. 17 and 18 are schematic side views illustrating different conditions of an apparatus for helping to protect an occupant of a vehicle, according to a seventh embodiment of the invention.
Figure 18:
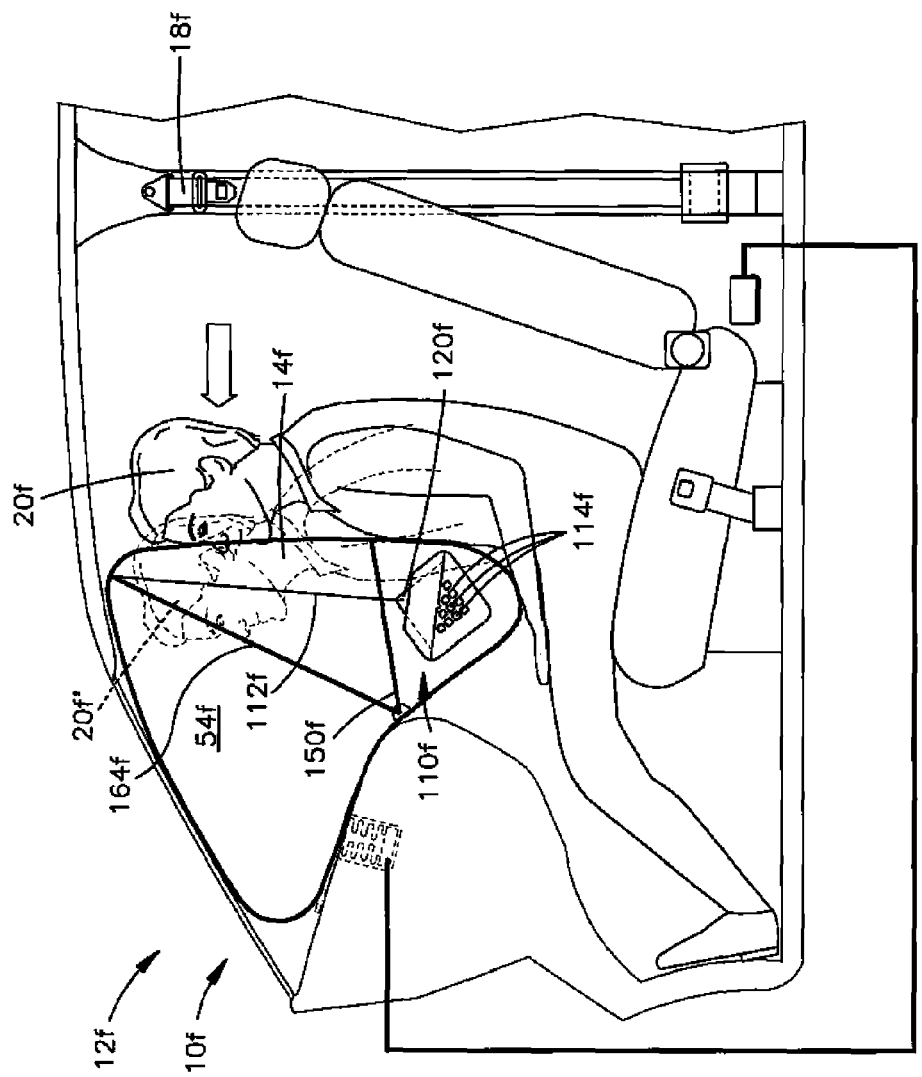

A seventh embodiment of the present invention is illustrated in FIGS. 17 and 18. Certain components in FIGS. 17 and 18 are similar or identical to components of FIGS. 7 and 8. The suffix "f" is added to the reference numbers of these similar or identical components in FIGS. 17 and 18 to avoid confusion. The embodiment of FIGS. 17 and 18 includes an adaptive tether and an adaptive vent, both of which are similar to those of the embodiment of FIGS. 7 and 8. The difference between the embodiment of FIGS. 17 and 18 and the embodiment of FIGS. 7 and 8 is that vent in the embodiment of FIGS. 17 and 18 is adapted to open instead of close in response to occupant penetration.

The apparatus 10f of FIGS. 17 and 18 includes an adaptive vent 110f for helping to protect an occupant 20f of the vehicle 12f. The vent 110f of FIGS. 17 and 18 is similar or identical to the vent in FIGS. 7 and 8, except that the vent 110f of FIGS. 17 and 18 is initially closed and adapted to open in response to whether the occupant 20f is belted or un-belted at the time of an event for which inflation of the air bag 14f is desired. As shown in FIGS. 17 and 18, the vent 110f has essentially the same construction as that shown in FIGS. 7 and 8. In the embodiment of FIGS. 17 and 18, however, the orientation of the vent 110f is essentially rotated 180 degrees.

This orientation allows the vent 110f to be initially closed prior to inflation and deployment of the air bag 14f. In this configuration, the vent door 120f is held initially in the closed condition (see FIG. 17) by means (not shown) such as tear stitching or a releasable adhesive. The vent 110f has a closed condition (FIG. 17) in which the vent door 120f covers the vent openings 114f and thereby blocks inflation fluid from venting, i.e., flowing, through the vent openings. In the closed condition, the vent door 120f is held in place by releasable means (not shown), such as tear stitching. When tension on the vent tether 112f reaches a threshold magnitude, the tear stitching ruptures, which releases the vent door 120f to move to the open condition illustrated in FIG. 18. In the open condition, the vent door 120f is positioned away from the vent openings 114f and thereby permits inflation fluid to vent, i.e., flow, through the vent openings. In the open condition, the vent door 120f is folded away from the vent openings 114f and held in this position by the tension on the vent tether 112f.

According to the embodiment of FIGS. 17 and 18, the vent 110f remains closed and blocks inflation fluid from venting from the inflatable volume 54f in response to a belted occupant 20f (FIG. 17). Maintaining the vent 110f in the closed condition in the case of the belted occupant 20f may be desirable. For example, since the belted occupant 20f is restrained by the seatbelt 18f, it may be desirable to provide a higher degree of air bag pressurization since the seatbelt 18f will aid in energy dissipation.

Additionally, according to the embodiment of FIGS. 17 and 18, the vent 110f closes and blocks inflation fluid from venting from the inflatable volume 54f in response to an un-belted occupant 20f (FIG. 18). Maintaining the vent 110f in the closed condition in the case of the un-belted occupant 20f may also be desirable. For example, since the un-belted occupant 20f is not restrained by the seatbelt 18f, it may be desirable to provide a higher degree of air bag pressurization to produce the necessary degree of energy dissipation and absorption.

From the above, those skilled in the art will appreciate that, according to the present invention, the adaptive tether 150f and the vent 110f in combination act to shape the air bag 14f and block inflation fluid venting in the event of a belted occupant 20f, and act to shape the air bag and vent inflation fluid in the event of an un-belted occupant. Advantageously, the adaptive shaping and venting achieved through the adaptive tether 150f and vent 110f are controlled passively and respond without the need to actively monitor the occupant or vehicle and without the need to actively actuate the tether or vent. The adaptive tether 150f and vent 110f respond to air bag deployment and the manner in which the occupant 20f strikes the bag.

As another advantage, by adjusting the relative lengths of the adaptive tether 150f and the vent tether 112f or by adjusting the relative positions at which the adaptive tether and vent tether are connected to the air bag 14f, the air bag can be adapted to vent or block venting of inflation fluid from the air bag when the bag is at a predetermined shape defined by the shaping tether 164f. For example, the relative lengths of the tethers 150f and 112f, the relative positions at which the tethers are connected to the air bag 14f, or both the relative lengths and connection positions of the tethers could be adapted such that the vent 110f opens and vents inflation fluid at any time before or up to the time that the air bag reaches the fully inflated and deployed condition of FIG. 18. Therefore, although the vent 110f is illustrated as venting inflation fluid when the air bag reaches the large volume condition of FIG. 18, the vent 110f could be adapted to begin inflation fluid venting when the air bag reaches any degree of air bag inflation between the small volume condition of FIG. 17 and the large volume condition of FIG. 18.

Figure 19:
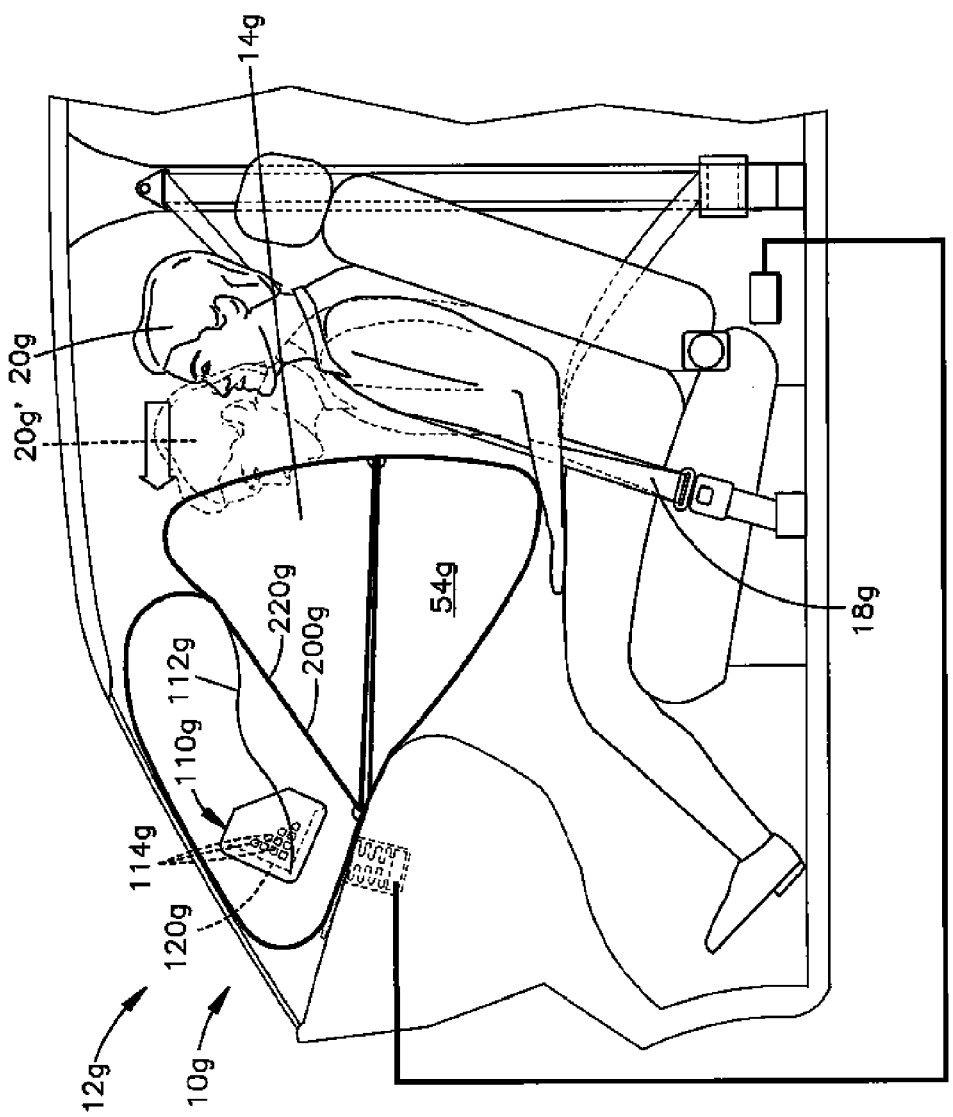
FIGS. 19 and 20 are schematic side views illustrating different conditions of an apparatus for helping to protect an occupant of a vehicle, according to a eighth embodiment of the invention.
Figure 20:
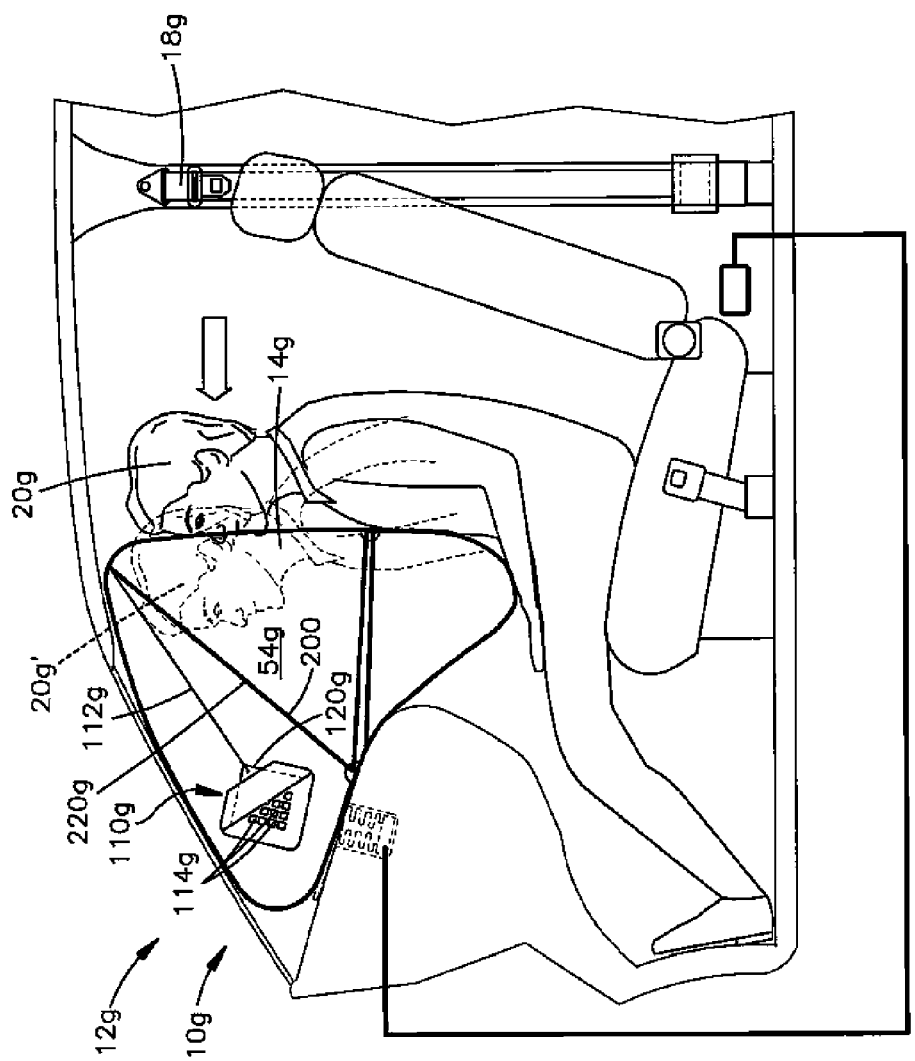

An eighth embodiment of the present invention is illustrated in FIGS. 19 and 20. Certain components in FIGS. 19 and 20 are similar or identical to components of FIGS. 9 and 10. The suffix "g" is added to the reference numbers of these similar or identical components in FIGS. 19 and 20 to avoid confusion. The embodiment of FIGS. 19 and 20 includes an adaptive tether and an adaptive vent, both of which are similar to those of the embodiment of FIGS. 9 and 10. The difference between the embodiment of FIGS. 19 and 20 and the embodiment of FIGS. 9 and 10 is that vent in the embodiment of FIGS. 19 and 20 is adapted to open instead of close in response to occupant penetration.

The apparatus 10g of FIGS. 19 and 20 includes an adaptive vent 110g for helping to protect an occupant 20g of the vehicle 12g. The vent 110g of FIGS. 19 and 20 is similar or identical to the vent in FIGS. 9 and 10, except that the vent 110g of FIGS. 19 and 20 is initially closed and adapted to open in response to whether the occupant 20g is belted or un-belted at the time of an event for which inflation of the air bag 14g is desired. As shown in FIGS. 19 and 20, the vent 110g has essentially the same construction as that shown in FIGS. 9 and 10. In the embodiment of FIGS. 19 and 20, however, the orientation of the vent 110g is essentially rotated 180 degrees.

This orientation allows the vent 110g to be initially closed prior to inflation and deployment of the air bag 14g. In this configuration, the vent door 120g is held initially in the closed condition (see FIG. 19) by means (not shown) such as tear stitching or a releasable adhesive. The vent 110g has a closed condition (FIG. 19) in which the vent door 120g covers the vent openings 114g and thereby blocks inflation fluid from venting, i.e., flowing, through the vent openings. In the closed condition, the vent door 120g is held in place by releasable means (not shown), such as tear stitching. When tension on the vent tether 112g reaches a threshold magnitude, the tear stitching ruptures, which releases the vent door 120g to move to the open condition illustrated in FIG. 20. In the open condition, the vent door 120g is positioned away from the vent openings 114g and thereby permits inflation fluid to vent, i.e., flow, through the vent openings. In the open condition, the vent door 120g is folded away from the vent openings 114g and held in this position by the tension on the vent tether 112g.

According to the embodiment of FIGS. 19 and 20, the vent 110g remains closed and blocks inflation fluid from venting from the inflatable volume 54g in response to a belted occupant 20g (FIG. 19). Maintaining the vent 110g in the closed condition in the case of the belted occupant 20g may be desirable. For example, since the belted occupant 20g is restrained by the seatbelt 18g, it may be desirable to provide a higher degree of air bag pressurization since the seatbelt 18g will aid in energy dissipation.

Additionally, according to the embodiment of FIGS. 19 and 20, the vent 110g closes and blocks inflation fluid from venting from the inflatable volume 54g in response to an un-belted occupant 20g (FIG. 20). Maintaining the vent 110g in the closed condition in the case of the un-belted occupant 20g may also be desirable. For example, since the un-belted occupant 20g is not restrained by the seatbelt 18g, it may be desirable to provide a higher degree of air bag pressurization to produce the necessary degree of energy dissipation and absorption.

From the above, those skilled in the art will appreciate that, according to the present invention, the adaptive tether 200g and the vent 110g in combination act to shape the air bag 14g and block inflation fluid venting in the event of a belted occupant 20g, and act to shape the air bag and vent inflation fluid in the event of an un-belted occupant. Advantageously, the adaptive shaping and venting achieved through the adaptive tether 200g and vent 110g are controlled passively and respond without the need to actively monitor the occupant or vehicle and without the need to actively actuate the tether or vent. The adaptive tether 200g and vent 110g respond to air bag deployment and the manner in which the occupant 20g strikes the bag.

As another advantage, by adjusting the relative lengths of the adaptive tether 200g and the vent tether 112g or by adjusting the relative positions at which the adaptive tether and vent tether are connected to the air bag 14g, the air bag can be adapted to vent or block venting of inflation fluid from the air bag when the bag is at a predetermined shape defined by the shaping tether 220g. For example, the relative lengths of the tethers 200g and 112g, the relative positions at which the tethers are connected to the air bag 14g, or both the relative lengths and connection positions of the tethers could be adapted such that the vent 110g opens and vents inflation fluid at any time before or up to the time that the air bag reaches the fully inflated and deployed condition of FIG. 20. Therefore, although the vent 110g is illustrated as venting inflation fluid when the air bag reaches the large volume condition of FIG. 20, the vent 110g could be adapted to begin inflation fluid venting when the air bag reaches any degree of air bag inflation between the small volume condition of FIG. 19 and the large volume condition of FIG. 20.

From the various embodiments disclosed herein, those skilled in the art will appreciate that the shaping effects that an adaptive shaping tether has on the shape and deployment of an air bag can be configured to achieve desired results. For example, as illustrated in the embodiment of FIGS. 9 and 10, one or more guides can be implemented to tailor the degree to which movement of one portion of the air bag affects movement, and thus the inflated shape, of another portion of the air bag. Decreasing the number of guides can reduce the degree of shape change that the tether applies to the air bag. Increasing the number of guides can increase the degree of shape change that the tether applies to the air bag. Also, the shaping effects of the tether can be adjusted by changing the portion of panel of the air bag to which the trigger tether portion is secured.

For example, in the embodiment of FIGS. 9 and 10, occupant penetration a given distance would produce a resulting increase in the length of the shaping tether 220 that is twice the given distance. If the number of guides is decreased, for example by removing the guide 212, occupant penetration a given distance would produce a resulting increase in the length of the shaping tether 220 that is equal to the given distance. Similarly, if the number of guides is increased by providing guides in addition to those illustrated at 212e and 214, occupant penetration a given distance would produce a resulting increase in the length of the shaping tether 220 that is correspondingly increased over the twofold increase of the illustrated two-guide embodiment.

The tethers of the embodiments illustrated in FIGS. 1-10 and 15-20 may have a variety of configurations designed to achieve the particular functions identified in those embodiments. Example tether configurations are illustrated in FIGS. 12-13.

FIG. 12 illustrates a tether configuration that may be implemented in the embodiments of FIGS. 1-4 and therefore is representative of the tethers 60 and 60a. As shown in FIG. 12, the tether 300 is a three-leg tether that includes a first segment that serves as a trigger tether 302, a second segment that serves as a shaping tether 304, and a third segment that serves as an anchor tether 306. The trigger tether 302, shaping tether 304, and anchor tether 306 intersect and are interconnected at a common point 308 from which the tethers extend.

The anchor tether 306 has a first end portion 310 for being secured to the air bag or to structure of the vehicle, such as the air bag module or the instrument panel, at an anchor point. The trigger tether 302 has a first end portion 312 secured to the air bag, for example to a lower portion of a front panel of the air bag. The shaping tether 304 has a first end portion 314 for being secured to the air bag, for example to an upper portion of the front panel of the air bag.

As shown in FIG. 12, the first end portion 312 of the trigger tether 302 and the first end portion 314 of the shaping tether 314 have tapered configurations in which the end portions flare outward to widened terminal end edges 316 and 318, respectively. The widened terminal end portions 316 and 318 allow for connection trigger and shaping tethers 302 and 304 to a wide portion of the front panel of the air bag. This helps distribute the forces applied to the front panel by tethers 302 and 304 across a wide area of the front panel so that the tethers shape the air bag in a desired manner.

FIG. 13 illustrates a tether configuration that may be implemented in the embodiments of FIGS. 5-8 and therefore is representative of the tethers 150 and 150c. As shown in FIG. 13, the tether 320 is a two-leg tether that includes a first segment that serves as a trigger tether 322 and a second segment that serves as a shaping tether 324. The first segment/trigger tether 322 and second segment/shaping tether 324 are defined at least partially by a guide 326 through which the tether 320 extends. The trigger tether 322 has a first end portion 332 secured to the air bag, for example to a lower portion of a front panel of the air bag. The shaping tether 324 has a first end portion 334 for being secured to the air bag, for example to an upper portion of the front panel of the air bag.

As shown in FIG. 13, the first end portion 332 of the trigger tether 322 and the first end portion 334 of the shaping tether 324 have tapered configurations in which the end portions flare outward to widened terminal end edges 336 and 338, respectively. The widened terminal end portions 336 and 338 allow for connection of the trigger and shaping tethers 322 and 324 to a wide portion of the front panel of the air bag. This helps distribute the forces applied to the front panel by tethers 322 and 324 across a wide area of the front panel so that the tethers shape the air bag in a desired manner.

FIG. 14 illustrates a tether configuration that may be implemented in the embodiments of FIGS. 9-10 and therefore is representative of the tether 200. As shown in FIG. 14, the tether 340 has a first end portion 342 for being secured to the air bag, for example at a location adjacent the instrument panel of the air bag. A second end portion 344 of the tether 340 is for being connected to the air bag, for example at an upper portion of a front panel of the air bag. The tether 340 has a portion for extending through a first guide 350 connected to the air bag at a location such as a mid/lower portion of the front panel. The tether 340 also has a portion for extending through a second guide 352 on a portion of the air bag, such as a location adjacent or near an instrument panel of the vehicle. The first and second guides 350 and 352 may comprise openings, such as D-rings, loops, or apertures in air bag material.

The first guide 350 comprises an aperture 360 in a piece of fabric 362 that has a tapered configuration in which an end portion 364 flares outward to a widened terminal end edge 366. The second end portion 344 of the tether 340 also has a tapered configuration in which the end portion flares outward to a widened terminal end edge 374. The widened terminal end portions 366 and 374 allow for connection to a wide portion of the front panel of the air bag. This helps distribute the forces applied to the front panel by the tether 340 across a wide area of the front panel so that the tethers shape the air bag in a desired manner.

The arrangements of the adaptive tethers and vents of the various embodiments depicted herein are illustrative of example embodiments. The specific configurations of these embodiments could be changed without departing from the spirit of the present invention. For example, while the adaptive tether and vents of the present invention are depicted herein implemented in a passenger side frontal air bag, those skilled in the art will appreciate that the adaptive tether and vent structure could be applied to other inflatable vehicle occupant protection devices, such as driver side frontal air bags, side impact air bags, side curtain air bags, and inflatable knee bolsters or knee air bags.

Also, while the adaptive tethers of the various embodiments disclosed herein are illustrated as adapting the height of the air bag in response to occupant penetration into a lower portion of the air bag, the adaptive tethers could be adapted using the same principles disclosed herein, to adapt other dimensions of the air bag in response to occupant penetration into one or more portions of the air bag. For example, the adaptive tether could be adapted to control the width of the air bag in response to occupant penetration into a lateral portion of the air bag. For instance, in the event of an offset or skewed collision, the occupant may penetrate a lateral portion of the air bag. In this instance, the adaptive tether could be adapted to produce lateral expansion of the air bag in response to the lateral occupant penetration. Similarly, the adaptive tether could be adapted to produce air bag expansion or contraction in virtually any dimension in response to occupant penetration into the air bag.

Additionally, while the vents are illustrated as being positioned at certain locations on side panels of the air bags, the vents could be positioned at alternative locations on the side panels or on other panels of the air bags. Further, although only a single vent is illustrated in the disclosed embodiments, the air bags could include multiple vents.

Figure 21:
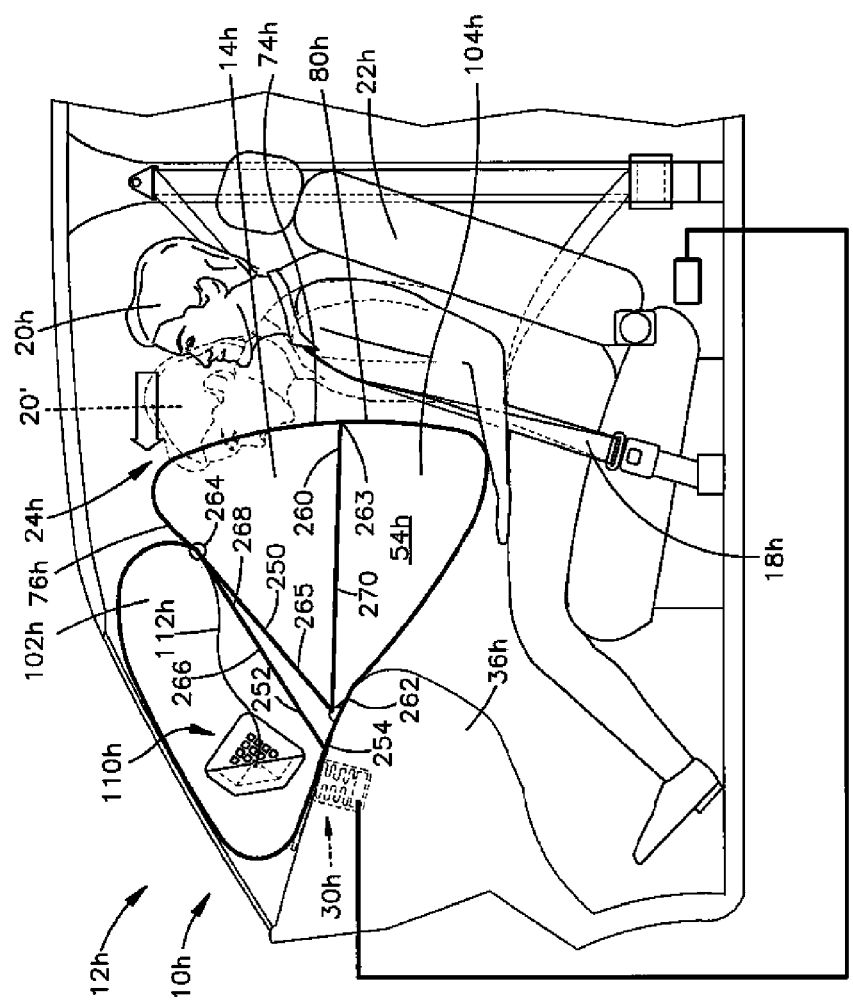
FIGS. 21 and 22 are schematic side views illustrating different conditions of an apparatus for helping to protect an occupant of a vehicle, according to a ninth embodiment of the invention.
Figure 22:
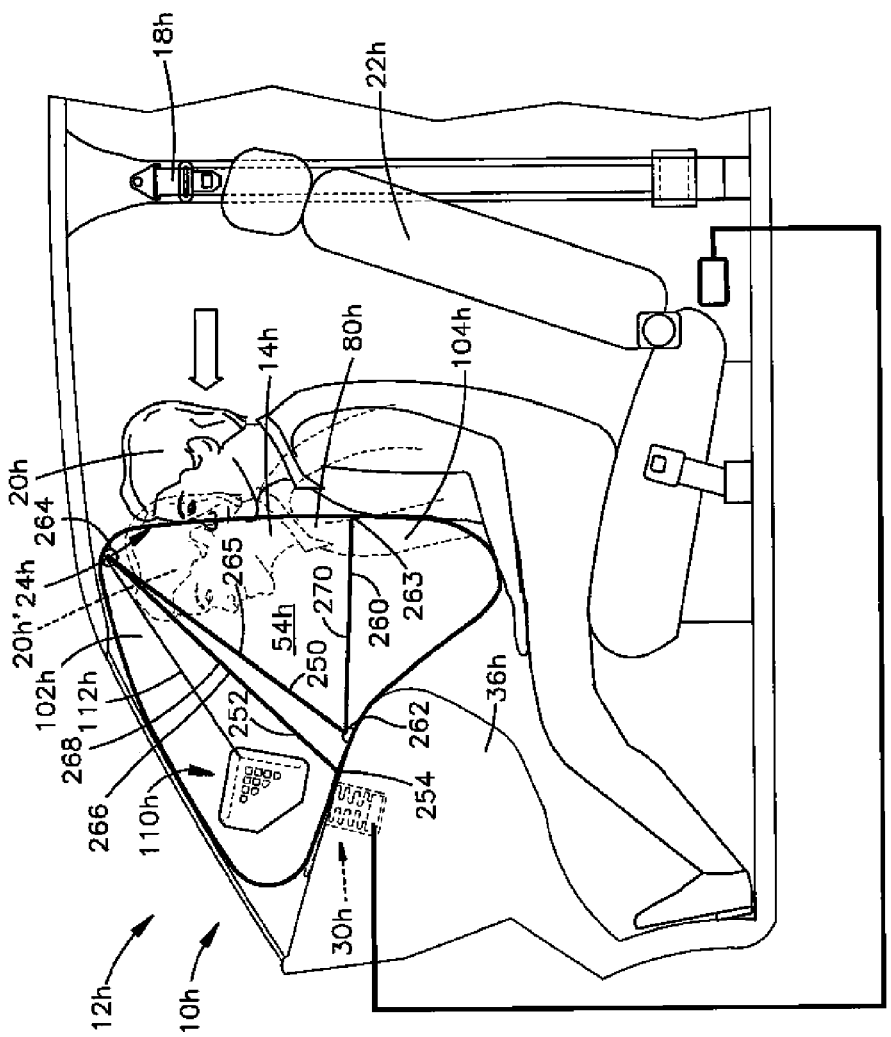

A ninth embodiment of the present invention is illustrated in FIGS. 21 and 22. Certain components in FIGS. 21 and 22 are similar or identical to components of FIGS. 9 and 10. The suffix "h" is added to the reference numbers of these similar or identical components in FIGS. 21 and 22 to avoid confusion. The embodiment of FIGS. 21 and 22 includes an adaptive tether and an adaptive vent, both of which are similar to those of the embodiment of FIGS. 9 and 10.

Referring to FIGS. 21 and 22, an apparatus 10h for helping to protect an occupant 20h of a vehicle 12h includes an inflatable vehicle occupant protection device 14h in the form of an air bag. In the embodiment illustrated in FIGS. 21 and 22, the air bag 14h is a passenger frontal air bag for helping to protect an occupant 20h of a seat 22h on a passenger side 24h of the vehicle 12h. As shown in FIGS. 21 and 22, the vehicle 12h also includes a seatbelt 18h for helping to protect the vehicle occupant 20h.

The air bag 14h of the ninth embodiment may be similar or identical in construction and function to the air bag and air bag module of the embodiment of the present invention illustrated in FIGS. 9 and 10. The air bag 14h of FIGS. 21 and 22 includes a tether 250 for adapting the configuration of the air bag 14h depending on vehicle or occupant conditions.

The tether 250 comprises a single length of material that has a first end portion 252 secured to the air bag 14h, for example at a location 254 adjacent the instrument panel 36h of the air bag. A second end portion 260 of the tether 250 is connected to a mid/lower portion 80h of the front panel 74h of the air bag 14h at location 263. The tether 250 extends through a first guide 262 on the air bag 14h at a location such as adjacent or near the location 254 adjacent the instrument panel 36h. The tether 250 also extends through a second guide 264 on the air bag 14h at a location adjacent or near the upper portion 76h of the front panel 74h of the air bag. The first and second guides 262 and 264 anchor the tether 250 to the air bag and permit the tether 250 to slide or otherwise move through their respective structures. The guides 262 and 264 may, for example, comprise loops of material, such as air bag material, sewn or otherwise secured to respective panels of the air bag 14h. The guides 262 and 264 divide the tether 250 into segments: first and second segments 265 and 266 that together serve as a shaping tether 268 and a third segment that serves as a trigger tether 270.

The adaptive tether 250 of the embodiment of FIGS. 21 and 22 is responsive to vehicle conditions, occupant conditions, or both vehicle conditions and occupant conditions to adapt the inflated condition of the air bag 14h. Particularly, the tether 250 may adapt the inflation, deployment, configuration, shape, pressurization, or a combination thereof, of the air bag 14h passively, in a manner that is similar to the embodiment of FIGS. 9 and 10. In the embodiment of FIGS. 21 and 22, the air bag 14h and adaptive tether 250 are constructed, configured, and arranged to adapt the inflated condition of the air bag 14h depending on whether the occupant 20h is restrained by the seatbelt 18h at the time that the air bag 14h is deployed.

The mid/lower portion 80h of the front panel 74h to which the trigger tether 270 is connected has a large surface area and radius of curvature (see FIG. 21) compared to the upper portion 76h of the front panel to which the shaping tether 268 is connected. The degree to which the surface area and radius of curvature of the upper portion 76h (see FIG. 22) is smaller than that of the mid/lower portion 80h may be several fold. For the construction illustrated in FIGS. 21 and 22, the mid/lower portion 80h of the front panel 74h exerts a force on the trigger tether 270 that is greater than the force exerted on the shaping tether 268 by the upper portion 76h of the front panel.

When the air bag 14h inflates and deploys, the gas pressure in the bag acts normal to the surface of the panels defining the inflatable volume 54h of the bag. The gas pressure in the air bag 14h, acting on the comparatively large surface area of the mid/lower portion 80h, exerts a correspondingly large force on the trigger tether 270. Conversely, the gas pressure acting on the comparatively small surface area of the upper portion 76h exerts a correspondingly small force on the shaping tether 268. As a result, the force urged on the shaping tether 268 by the upper portion 76h is substantially overcome by the tensioned trigger tether 270. Because of this, as shown in FIG. 21, the mid/lower portion 80h pulls the tether 250 through the guides 262 and 264, lengthening the trigger tether 270 and shortening the shaping tether 268. As a result, the shaping tether 268 restricts deployment of the upper portion 76h, thus giving the air bag 14h the shape illustrated in FIG. 21.

The tether 250 of the embodiment of FIGS. 21 and 22 tailors the inflated condition of the air bag 14h in response to the buckled status of the vehicle occupant 20h. In the case of the buckled occupant 20h, the tether 250 maintains the basic configuration illustrated in FIG. 21, restraining the upper portion 102h from deploying fully while permitting the lower portion 104h to deploy fully. As a result, the air bag 14h is initially deployed and maintained in configuration of FIG. 21, which is a low volume configuration in comparison with the configuration of FIG. 22. The low volume configuration of the air bag 14h in FIG. 21 requires a lesser volume of inflation fluid in order to achieve the desired inflation, deployment, and pressurization characteristics. This can help reduce the required size and cost of the inflator and also helps ensure reliability in inflation and deployment.

Since the unbuckled occupant is the worst case scenario, the inflator is sized to provide a volume of inflation fluid sufficient to inflate, deploy, and pressurize the air bag 14h to the large volume inflated condition of FIG. 22 within the desired performance parameters. This being the case, the volume of inflation fluid delivered by the inflator is certainly sufficient to inflate, deploy, and pressurize the air bag 14h to the small volume inflated condition of FIG. 21 within the desired performance parameters. Since the buckled occupant is the expected condition, the tether configuration of FIGS. 21 and 22 helps bolster the reliability of the apparatus.

In the case of the unbuckled occupant 20h, the air bag 14h initially inflates toward the configuration where the tether 250 maintains the basic configuration illustrated in FIG. 21. The unbelted occupant 20h, however, being unrestrained by the seatbelt 18h, moves into engagement with the lower portion 104h, moves the lower portion toward the instrument panel 36h, thus relieving the force exerted on the trigger tether 270 by the mid/lower portion 80h of the front panel 74h. As a result, the tether 250 moves through the guides 262 and 264, thus shortening the trigger tether 270 and lengthening the shaping tether 268, thereby releasing the upper portion 102h of the air bag 14h to deploy fully to the position illustrated in FIG. 22. The upper portion 102h, when in this position, is positioned to receive and cushion the unbelted occupant 20h'. Those skilled in the art will appreciate that the degree to which the tether 250 releases the upper portion 102h of the air bag to deploy is proportional to the degree to which the occupant 20h penetrates the air bag 14h.

Those skilled in the art will thus appreciate that, advantageously, the tether 250 of the present invention adapts the configuration of the air bag 14h depending on whether the occupant 20h is restrained by the seatbelt 18h. The tether 250 tailors the configuration of the air bag 14h so that the air bag has a comparatively small volume while covering the space where the buckled occupant 20h (FIG. 21) strikes the air bag. Also, the tether 250 tailors the configuration of the air bag 14h so that the air bag has a comparatively large volume while covering the space where the unbuckled occupant 20h (FIG. 22) strikes the air bag.

In the embodiment of FIGS. 21 and 22, the inclusion of the first and second guides 262 and 264 configures the tether 250 to tailor the shape of the air bag 14h in a manner different than the single guide embodiments of FIGS. 5-8 and the two-guide embodiments of FIGS. 9 and 10. The two-guide configuration effectively halves the length of the shaping tether 268 that is taken up due to the front panel 74h moving in the deployment direction and tensioning the trigger tether 270. Similarly, the two-guide configuration effectively halves the length of the shaping tether 268 that is released due to the occupant 20*h* moving the front panel 74*h* against the deployment direction and toward the instrument panel 36*h*. The two-guide configuration of FIGS. 21 and 22 thus reduces the extent to which the upper portion 76*h* is restricted from deploying in the case of the belted occupant 20*h* (see FIG. 21).

The air bag 14*h* of the embodiment of FIGS. 21 and 22 also includes a vent 110*h* that is selectively actuatable to release inflation fluid from the inflatable volume 54*h* of the air bag 14*h*. In the embodiment of FIGS. 21 and 22, the tether 250 functions separately and independently of the vent 110*h*. The tether 250 of FIGS. 21 and 22 functions as described above regardless of whether the air bag 14*h* includes the vent 110*h*. The vent 110*h* is therefore an optional feature of the air bag 14*h*. The air bag 14*h* of the embodiment of FIGS. 21 and 22 thus may or may not include the vent 110*h*.

The vent 110*h* may be similar or identical in construction, configuration, and function to the vent of the embodiment of FIGS. 9 and 10. The vent 110*h* includes an adaptive vent tether 112*h* that is operative to actuate the vent 110*h* in response to vehicle and occupant conditions at the time the air bag is deployed. The vent 110*h* thus may selectively release inflation fluid from the air bag 14*h* depending on these conditions. More particularly, the vent 110*h* is constructed and arranged to adapt to whether the occupant 20*h* is belted or un-belted at the time of an event for which inflation of the air bag 14*h* is desired. This is because the vent tether 112*h*, being connected to the upper portion 76*h* of the front panel 74*h* at or near the connection of the shaping tether 268, is configured to become tensioned in response to deployment of the upper portion.

According to the embodiment of FIGS. 21 and 22, the vent 110*h* remains open and vents inflation fluid from the inflatable volume 54*h* in response to a belted occupant 20*h* (FIG. 21). Maintaining the vent 110*h* in the open condition in the case of the belted occupant 20*h* may be desirable. For example, since the belted occupant 20*h* is restrained by the seatbelt 18*h*, it may be desirable to provide a lower degree of air bag pressurization to produce the necessary degree of energy dissipation and absorption.

Additionally, according to the embodiment of FIGS. 21 and 22, the vent 110*h* closes and blocks inflation fluid from venting from the inflatable volume 54*h* in response to an un-belted occupant 20*h* (FIG. 22). Maintaining the vent 110*h* in the closed condition in the case of the un-belted occupant 20*h* may also be desirable. For example, since the un-belted occupant 20*h* is not restrained by the seatbelt 18*h*, it may be desirable to provide a higher degree of air bag pressurization to produce the necessary degree of energy dissipation and absorption.

As a further advantage, by adjusting the relative lengths of the adaptive tether 250 and the vent tether 112*h* or by adjusting the relative positions at which the adaptive tether and vent tether are connected to the air bag 14*h*, the air bag can be adapted to vent inflation fluid from the air bag when the bag is at a predetermined shape defined by the shaping tether 268. For example, the relative lengths of the tethers 250 and 112*h*, the relative positions at which the tethers are connected to the air bag 14*h*, or both the relative lengths and connection positions of the tethers could be adapted such that the vent 110*h* blocks inflation fluid venting at any time before or up to the time that the air bag reaches the fully inflated and deployed condition of FIG. 22. Therefore, although the vent 110*h* is illustrated as blocking inflation fluid venting when the air bag reaches the large volume condition of FIG. 22, the vent 110*h* could be adapted to block inflation fluid venting when the air bag reaches any degree of air bag inflation between the small volume condition of FIG. 21 and the large volume condition of FIG. 22.

From the above, those skilled in the art will appreciate that, according to the present invention, the adaptive tether 250 and the vent 110*h* in combination act to shape the air bag 14*h* and vent inflation fluid from the air bag in the event of a belted occupant 20*h*, and act to shape the air bag and block inflation fluid venting in the event of an un-belted occupant. Advantageously, the adaptive shaping and venting achieved through the adaptive tether 250 and vent 110*h* are controlled passively and respond without the need to actively monitor the occupant or vehicle and without the need to actively actuate the tether or vent. The adaptive tether 250 and vent 110*h* respond to air bag deployment and the manner in which the occupant 20*h* strikes the bag.

Figure 23:
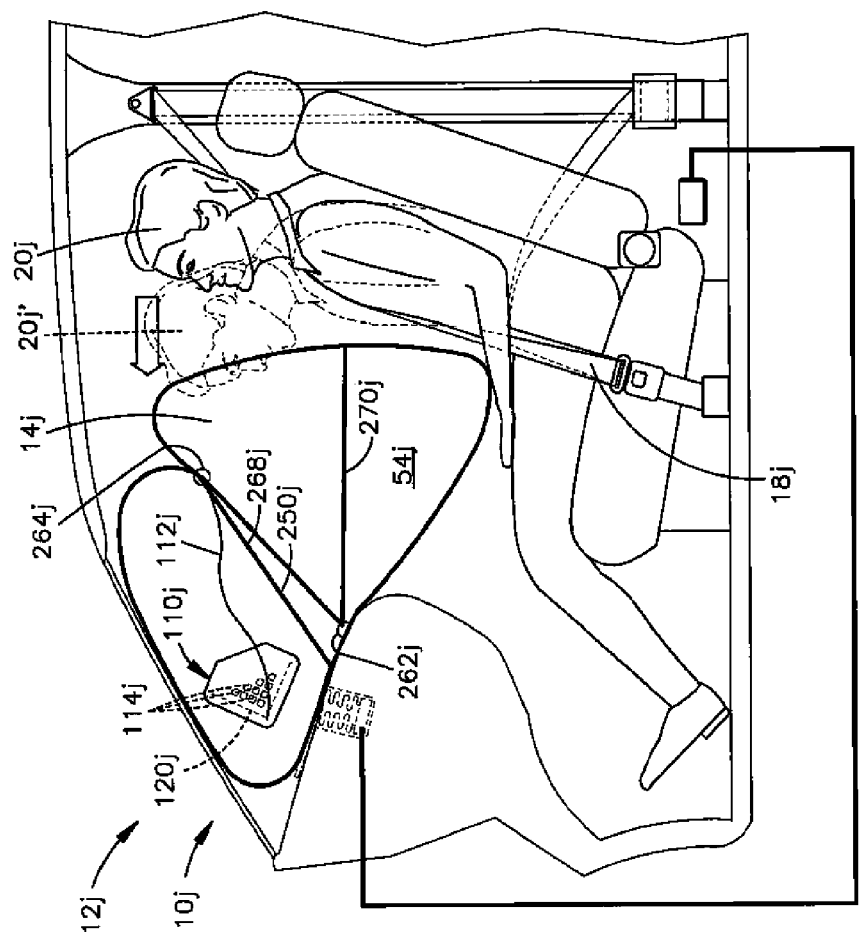
FIGS. 23 and 24 are schematic side views illustrating different conditions of an apparatus for helping to protect an occupant of a vehicle, according to a tenth embodiment of the invention.
Figure 24:
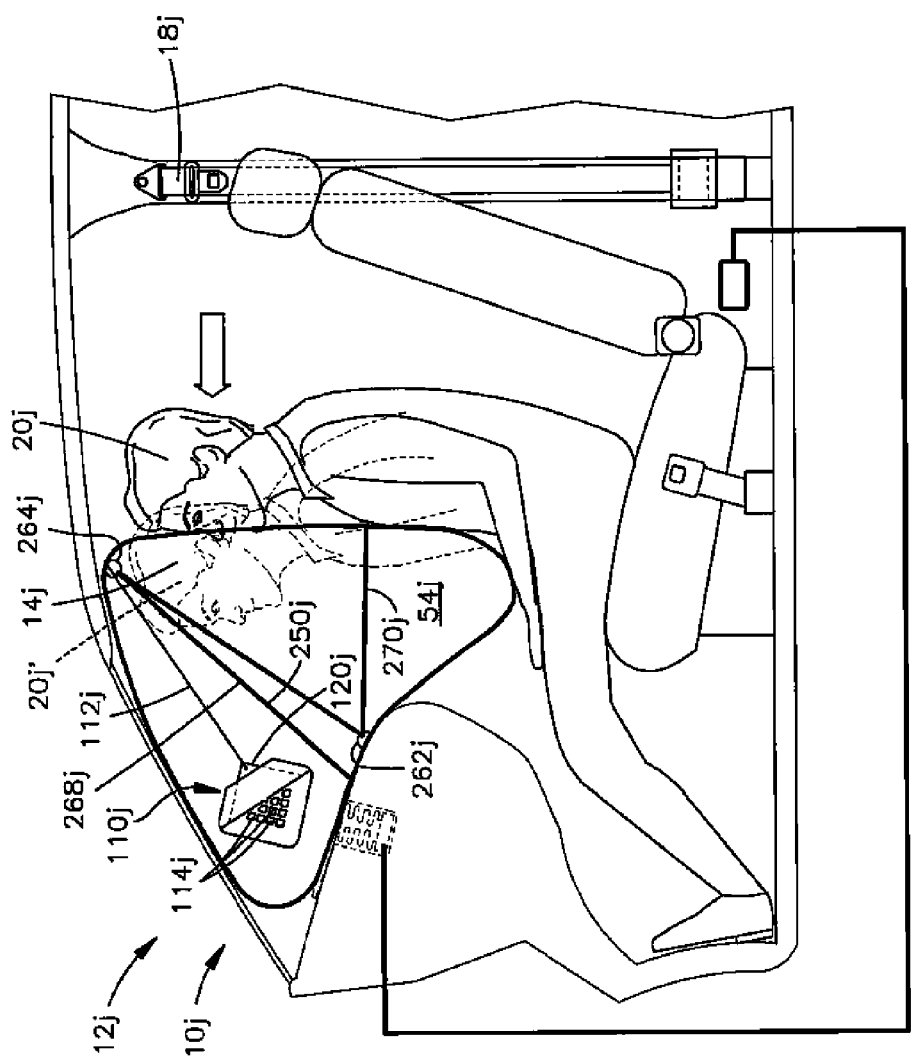

A tenth embodiment of the present invention is illustrated in FIGS. 23 and 24. Certain components in FIGS. 23 and 24 are similar or identical to components of FIGS. 21 and 22. The suffix "j" is added to the reference numbers of these similar or identical components in FIGS. 23 and 24 to avoid confusion. The embodiment of FIGS. 23 and 24 includes an adaptive tether and an adaptive vent that are similar to those of the embodiment of FIGS. 21 and 22. The difference between the embodiment of FIGS. 23 and 24 and the embodiment of FIGS. 21 and 22 is that vent in the embodiment of FIGS. 23 and 24 is adapted to open instead of close in response to occupant penetration.

The apparatus 10*j* of FIGS. 23 and 24 includes an adaptive vent 110*j* for helping to protect an occupant 20*j* of the vehicle 12*j*. The vent 110*j* of FIGS. 23 and 24 is similar or identical to the vent in FIGS. 19 and 20. The vent 110*j* of FIGS. 23 and 24 is initially closed and adapted to open in response to whether the occupant 20*j* is belted or un-belted at the time of an event for which inflation of the air bag 14*j* is desired. As shown in FIGS. 23 and 24, the vent 110*j* has essentially the same construction as that shown in FIGS. 21 and 22. In the embodiment of FIGS. 23 and 24, however, the orientation of the vent 110*j* is essentially rotated 180 degrees.

This orientation allows the vent 110*j* to be initially closed prior to inflation and deployment of the air bag 14*j*. In this configuration, the vent door 120*j* is held initially in the closed condition (see FIG. 23) by means (not shown) such as tear stitching or a releasable adhesive. In the closed condition of the vent 110*j*, the vent door 120*j* covers the vent openings 114*j* and thereby blocks inflation fluid from venting, i.e., flowing, through the vent openings. In the closed condition, the vent door 120*j* is held in place by releasable means (not shown), such as tear stitching. When tension on the vent tether 112*j* reaches a threshold magnitude, the tear stitching ruptures, which releases the vent door 120*j* to move to the open condition illustrated in FIG. 24. In the open condition, the vent door 120*j* is positioned away from the vent openings 114*j* and thereby permits inflation fluid to vent, i.e., flow, through the vent openings. In the open condition, the vent door 120*j* is folded away from the vent openings 114*j* and held in this position by the tension on the vent tether 112*j*.

According to the embodiment of FIGS. 23 and 24, the vent 110*j* remains closed and blocks inflation fluid from venting from the inflatable volume 54*j* in response to a belted occupant 20*j* (FIG. 23). Maintaining the vent 110*j* in the closed condition in the case of the belted occupant 20*j* may be desirable. For example, since the belted occupant 20*j* is restrained by the seatbelt 18*j*, it may be desirable to provide a higher degree of air bag pressurization since the seatbelt 18*j* will aid in energy dissipation.

Additionally, according to the embodiment of FIGS. 23 and 24, the vent 110j closes and blocks inflation fluid from venting from the inflatable volume 54j in response to an un-belted occupant 20j (FIG. 24). Maintaining the vent 110j in the closed condition in the case of the un-belted occupant 20j may also be desirable. For example, since the un-belted occupant 20j is not restrained by the seatbelt 18j, it may be desirable to provide a higher degree of air bag pressurization to produce the necessary degree of energy dissipation and absorption.

The apparatus 10j of FIGS. 23 and 24 includes an adaptive tether 250j that is similar or identical to the adaptive tether of the embodiment of FIGS. 21 and 22. According to the present invention, the adaptive tether 250j and the vent 110j in combination act to shape the air bag 14j and block inflation fluid venting in the event of a belted occupant 20j, and act to shape the air bag and vent inflation fluid in the event of an un-belted occupant. Advantageously, the adaptive shaping and venting achieved through the adaptive tether 250j and vent 110j are controlled passively and respond without the need to actively monitor the occupant or vehicle and without the need to actively actuate the tether or vent. The adaptive tether 250j and vent 110j respond to air bag deployment and the manner in which the occupant 20j strikes the bag.

In the embodiment of FIGS. 23 and 24, the inclusion of the first and second guides 262j and 264j effectively halve the length of the shaping tether 268j that is taken up due to the front panel 74j moving in the deployment direction and tensioning the trigger tether 270j. Similarly, the two-guide configuration effectively halves the length of the shaping tether 268j that is released due to the occupant 20j moving the front panel 74j against the deployment direction and toward the instrument panel 36j. The two-guide configuration of FIGS. 23 and 24 thus reduces the extent to which the upper portion 76j is restricted from deploying in the case of the belted occupant 20j (see FIG. 23).

As another advantage, by adjusting the relative lengths of the adaptive tether 250j and the vent tether 112j or by adjusting the relative positions at which the adaptive tether and vent tether are connected to the air bag 14j, the air bag can be adapted to vent or block venting of inflation fluid from the air bag when the bag is at a predetermined shape defined by the shaping tether 268j. For example, the relative lengths of the tethers 250j and 112j, the relative positions at which the tethers are connected to the air bag 14j, or both the relative lengths and connection positions of the tethers could be adapted such that the vent 110j opens and vents inflation fluid at any time before or up to the time that the air bag reaches the fully inflated and deployed condition of FIG. 24. Therefore, although the vent 110j is illustrated as venting inflation fluid when the air bag reaches the large volume condition of FIG. 24, the vent 110j could be adapted to begin inflation fluid venting when the air bag reaches any degree of air bag inflation between the small volume condition of FIG. 23 and the large volume condition of FIG. 24.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
an inflatable vehicle occupant protection device having a deflated condition and an inflated condition, the protection device comprising a panel that faces the occupant when the protection device is in the inflated condition; and
a tether having a first connection to a first portion of the panel and a second connection to a second portion of the panel, the first portion being a lower, torso receiving portion of the panel, the second portion being an upper, head receiving portion of the panel, wherein the first and second portions are configured such that pressurization of the protection device results in the first portion of the panel exerting a force on the tether that is greater than a force that the second portion of the panel exerts on the tether, this force differential allowing substantially full deployment of the first portion of the panel and causing the tether to prevent full deployment of the second portion of the panel in response to unrestricted deployment of the protection device and to permit further deployment of the second portion of the panel in response to occupant penetration into the first portion of the panel.

2. The apparatus recited in claim 1, wherein the degree to which the tether permits the second portion of the panel to deploy is proportional to the occupant penetration into the first portion of the panel.

3. The apparatus recited in claim 1, wherein the tether is a three-legged tether comprising first, second, and third segments that extend from a common point of connection, the first segment extending from the common point to the connection with the first portion of the panel, the second segment extending from the common point to the connection with the second portion of the panel, the third segment extending from the common point to an anchor point.

4. The apparatus recited in claim 3, wherein the first and second portions of the panel have curved configurations, the first portion having a radius of curvature greater than a radius of curvature of the second portion, the ratio of the radiuses of curvature of the first and second portions being configured such that the first portion of the panel applies tension to the first segment that is greater in magnitude than the tension applied to the second segment by the second portion of the panel;
the tension applied to the first segment, being greater than the tension applied to the second segment, causes the first and third segments of the tether to be tensioned along a substantially straight or near-straight line between the connection with the first portion of the front panel to the anchor point, deployment of the second portion of the panel being restricted by the second segment due to the tension along the first and third segments.

5. The apparatus recited in claim 4, wherein the tensioning of the first and third segments positions the common point substantially in linear alignment with the connection with the first portion and the anchor point.

6. The apparatus recited in claim 3, wherein the first and second segments of the tether have tapered configurations, the first segment tapering from wide at the connection with the first portion of the panel to narrow at the common point, the second segment tapering from wide at the connection with the second portion of the panel to narrow at the common point.

7. The apparatus recited in claim 3, wherein the anchor point comprises one of a portion of the protection device and a portion of a protection device module of which the protection device forms a component.

8. The apparatus recited in claim 1, further comprising a first guide through which the tether extends, the first guide dividing the tether into first and second segments, the first segment extending from the guide to the connection of the first portion of the tether to the panel, the second segment extending from the first guide to the connection of the second portion of the tether to the panel, penetration of the occupant into the first portion of the panel causing the tether to move through the first guide which shortens the first segment and lengthens the second segment, the lengthening of the second segment portion permitting further deployment of the second portion of the panel.

9. The apparatus recited in claim 8, wherein the first guide redirects the tether such that first segment extends in a first direction from the guide to the connection of the first portion of the tether to the panel, and the second segment extends in a second direction from the first guide to the connection of the second portion of the tether to the panel.

10. The apparatus recited in claim 8, wherein the first guide acts as a pulley for transferring forces acting on the first portion of the panel to forces acting on the second portion of the panel.

11. The apparatus recited in claim 8, wherein the connection of the first portion of the tether to the panel comprises a second guide that further divides the tether by defining a third segment that extends from the second guide to an anchor point, penetration of the occupant into the first portion of the panel causing the tether to move through the second guide in addition to the first guide which shortens the first and third segments and lengthens the second segment, the lengthening of the second segment permitting further deployment of the second portion of the panel.

12. The apparatus recited in claim 11, wherein the first and second guides redirect the tether such that first segment extends in a first direction from the guide to the connection of the first portion of the tether to the panel, the second segment extends in a second direction from the first guide to the connection of the second portion of the tether to the panel, and the third segment extends in a third direction from the second guide to the anchor point.

13. The apparatus recited in claim 11, wherein the first and second guides act as pulleys for transferring forces acting on the first portion of the panel to forces acting on the second portion of the panel.

14. The apparatus recited in claim 11, wherein movement of the tether through the first and second guides in response to occupant penetration into the first portion of the panel causes the length of the second segment to increase approximately twice the distance that the occupant penetrates into the first portion of the panel.

15. The apparatus recited in claim 8, wherein the connection of the second portion of the tether to the panel comprises a second guide that further divides the tether by defining a third segment that extends from the second guide to an anchor point, penetration of the occupant into the first portion of the panel causing the tether to move through the second guide in addition to the first guide which shortens the first segment and lengthens the second and third segments, the lengthening of the second and third segments permitting further deployment of the second portion of the panel.

16. The apparatus recited in claim 15, wherein the first and second guides redirect the tether such that first segment extends in a first direction from the connection of the first portion of the tether with the panel to the first guide, the second segment extends in a second direction from the first guide to the second guide, and the third segment extends in a third direction from the second guide to the anchor point.

17. The apparatus recited in claim 15, wherein the first and second guides act as pulleys for transferring forces acting on the first portion of the panel to forces acting on the second portion of the panel.

18. The apparatus recited in claim 15, wherein movement of the tether through the first and second guides in response to occupant penetration into the first portion of the panel causes the length of the second segment to increase approximately half the distance that the occupant penetrates into the first portion of the panel.

19. The apparatus recited in claim 1, wherein the protection device comprises a frontal air bag for helping to protect an occupant of a vehicle seat, the first portion of the panel comprising a lower portion for receiving a torso region of the occupant and the second portion of the panel comprising an upper portion for receiving a head region of the occupant.

20. The apparatus recited in claim 1, wherein the tether is operative to permit the second portion of the panel to deploy to a position for receiving the occupant's head in response to the occupant's torso penetrating into the first portion of the panel.

21. The apparatus recited in claim 1, wherein the tether is positioned at least partially within an inflatable volume of the protection device.

22. The apparatus recited in claim 1, wherein the panel comprises a front panel of the protection device, the first portion comprising a lower portion of the front panel and the second portion comprising an upper portion of the panel, the tether being operative to limit the deployed height of the upper portion in response to unrestricted deployment of the lower portion, the tether being further operative to increase the deployed height of the upper portion in response to restricted deployment of the lower portion.

23. The apparatus recited in claim 1, further comprising a vent actuatable from a non-actuated condition to an actuated condition in response to occupant penetration into the panel.

24. The apparatus recited in claim 23, wherein the non-actuated condition of the vent comprises one of an open condition and a closed condition of the vent, and the actuated condition of the vent comprises the other of the open condition and closed condition of the vent, the vent when in the open condition venting inflation fluid from the protection device, the vent when in the closed condition blocking inflation fluid from venting from the protection device.

25. The apparatus recited in claim 23, wherein the vent is adapted to be placed to the actuated condition in response to the tether permitting a predetermined degree of further deployment of the second portion toward full deployment.

26. The apparatus recited in claim 23, wherein the vent comprises a vent door and a vent tether connected to the vent door, the vent tether also being connected to the second portion of the panel, the vent tether being operative to pull the vent door toward the actuated condition in response to further deployment of the second portion toward full deployment.

27. The apparatus recited in claim 23, wherein the panel comprises a front panel of the protection device, the first portion comprising a lower portion of the front panel and the second portion comprising an upper portion of the panel, the vent tether being operative to maintain the vent in the non-actuated condition in response to unrestricted deployment of the lower portion, the vent tether being operative to place the vent in the actuated condition in response to restricted deployment of the lower portion.

28. An apparatus for helping to protect an occupant of a vehicle, the apparatus comprising:
an inflatable vehicle occupant protection device having a deflated condition and an inflated condition;

a guide on the protection device; and a tether that extends through the guide and shapes the protection device in the inflated condition, the tether comprising a first segment extending from the guide to a first connection with a first torso receiving lower portion of the protection device, and a second segment extending from the guide to a second connection with a second head receiving upper portion of the protection device;

the first segment of the tether permitting full deployment of the first portion of the protection device and the second segment restricting deployment of the second portion of the protection device in response to uninhibited deployment of the first portion of the protection device, the tether being constructed and arranged so that occupant penetration into the first portion of the protection device causes the tether to move through the guide to shorten the first segment and lengthen the second segment to permit further deployment of the second portion of the protection device.

29. The apparatus recited in claim 28, wherein the first connection and the second connection are located on a front panel of the protection device having a portion presented towards the occupant when the protection device is in the inflated condition.

30. The apparatus recited in claim 28, wherein the first segment of the tether extends directly from the guide to the first portion of the protection device and the second segment of the tether extends directly from the guide to the second portion of the protection device.

* * * * *